United States Patent
Opsal et al.

(10) Patent No.: US 8,049,903 B2
(45) Date of Patent: Nov. 1, 2011

(54) HIGH RESOLUTION MONITORING OF CD VARIATIONS

(75) Inventors: Jon Opsal, Livermore, CA (US); Ilya Grodnensky, Foster City, CA (US); Heath Pois, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 13/073,850

(22) Filed: Mar. 28, 2011

(65) Prior Publication Data

US 2011/0205554 A1 Aug. 25, 2011

Related U.S. Application Data

(63) Continuation of application No. 12/486,830, filed on Jun. 18, 2009, now Pat. No. 7,933,026, which is a continuation of application No. 11/657,359, filed on Jan. 24, 2007, now Pat. No. 7,567,351.

(60) Provisional application No. 60/764,701, filed on Feb. 2, 2006, provisional application No. 60/850,603, filed on Oct. 10, 2006.

(51) Int. Cl.
*G01B 11/14* (2006.01)
*G01N 21/00* (2006.01)

(52) U.S. Cl. ............ 356/625; 356/237.2; 356/369; 356/620

(58) Field of Classification Search ......... 356/620, 356/625, 630, 237.1–237.5, 369, 445
See application file for complete search history.

(56) References Cited

U.S. PATENT DOCUMENTS

| | | | |
|---|---|---|---|
| 4,999,014 A | 3/1991 | Gold et al. | |
| 5,042,951 A | 8/1991 | Gold et al. | |
| 5,181,080 A | 1/1993 | Fanton et al. | |
| 5,412,473 A | 5/1995 | Rosencwaig et al. | |
| 5,867,276 A | 2/1999 | McNeil et al. | |
| 5,877,859 A | 3/1999 | Aspnes et al. | |
| 6,278,519 B1 | 8/2001 | Rosencwaig et al. | |
| 6,429,943 B1 | 8/2002 | Opsal et al. | |
| 6,678,046 B2 | 1/2004 | Opsal | |
| 6,704,661 B1 | 3/2004 | Opsal et al. | |
| 6,768,967 B2 | 7/2004 | Johnson et al. | |
| 6,798,511 B1 | 9/2004 | Zhan et al. | |
| 6,813,034 B2 | 11/2004 | Rosencwaig et al. | |

(Continued)

OTHER PUBLICATIONS

George et al., "Neural Networks Applied to Diffraction-Pattern Sampling", Applied Optics, vol. 33, No. 14, 1994, pp. 3127-3134.

(Continued)

*Primary Examiner* — Layla Lauchman
(74) *Attorney, Agent, or Firm* — Morrison & Foerster LLP

(57) ABSTRACT

An optical metrology method is disclosed for evaluating the uniformity of characteristics within a semiconductor region having repeating features such a memory die. The method includes obtaining measurements with a probe laser beam having a spot size on the order of micron. These measurements are compared to calibration information obtained from calibration measurements. The calibration information is derived by measuring calibration samples with the probe laser beam and at least one other technology having added information content. In the preferred embodiment, the other technology includes at least one of spectroscopic reflectometry or spectroscopic ellipsometry.

16 Claims, 20 Drawing Sheets

U.S. PATENT DOCUMENTS

| | | |
|---|---|---|
| 6,867,866 B1 | 3/2005 | Chang et al. |
| 6,888,632 B2 | 5/2005 | Smith |
| 6,898,596 B2 | 5/2005 | Aikens et al. |
| 6,919,964 B2 | 7/2005 | Chu |
| 6,940,592 B2 | 9/2005 | Borden et al. |
| 6,952,261 B2 | 10/2005 | Ebert |
| 7,046,376 B2 | 5/2006 | Sezginer |
| 7,061,627 B2 | 6/2006 | Opsal et al. |
| 7,069,153 B2 | 6/2006 | Johnson |
| 7,145,664 B2 | 12/2006 | Opsal et al. |
| 7,564,552 B2 * | 7/2009 | Fielden et al. ............ 356/364 |
| 2006/0103844 A1 | 5/2006 | Opsal |

OTHER PUBLICATIONS

Kallioniemi et al., "Optical Scatterometry of Subwavelength Diffraction Gratings: Neural-Network Approach", Applied Optics, vol. 37, No. 25, 1998, pp. 5830-5835.

Krukar et al., "Using Scattered-light Modeling for Semiconductor Critical Dimension Metrology and Calibration", Proc. SPIE, vol. 1926, 1993, pp. 60-71.

Krukar et al., "Reactive Ion Etching Profile and Depth Characterization Using Statistical and Neural Network Analysis of Light Scattering Data", Journal of Applied Physics, vol. 74, No. 6, 1993, pp. 3698-3706.

\* cited by examiner

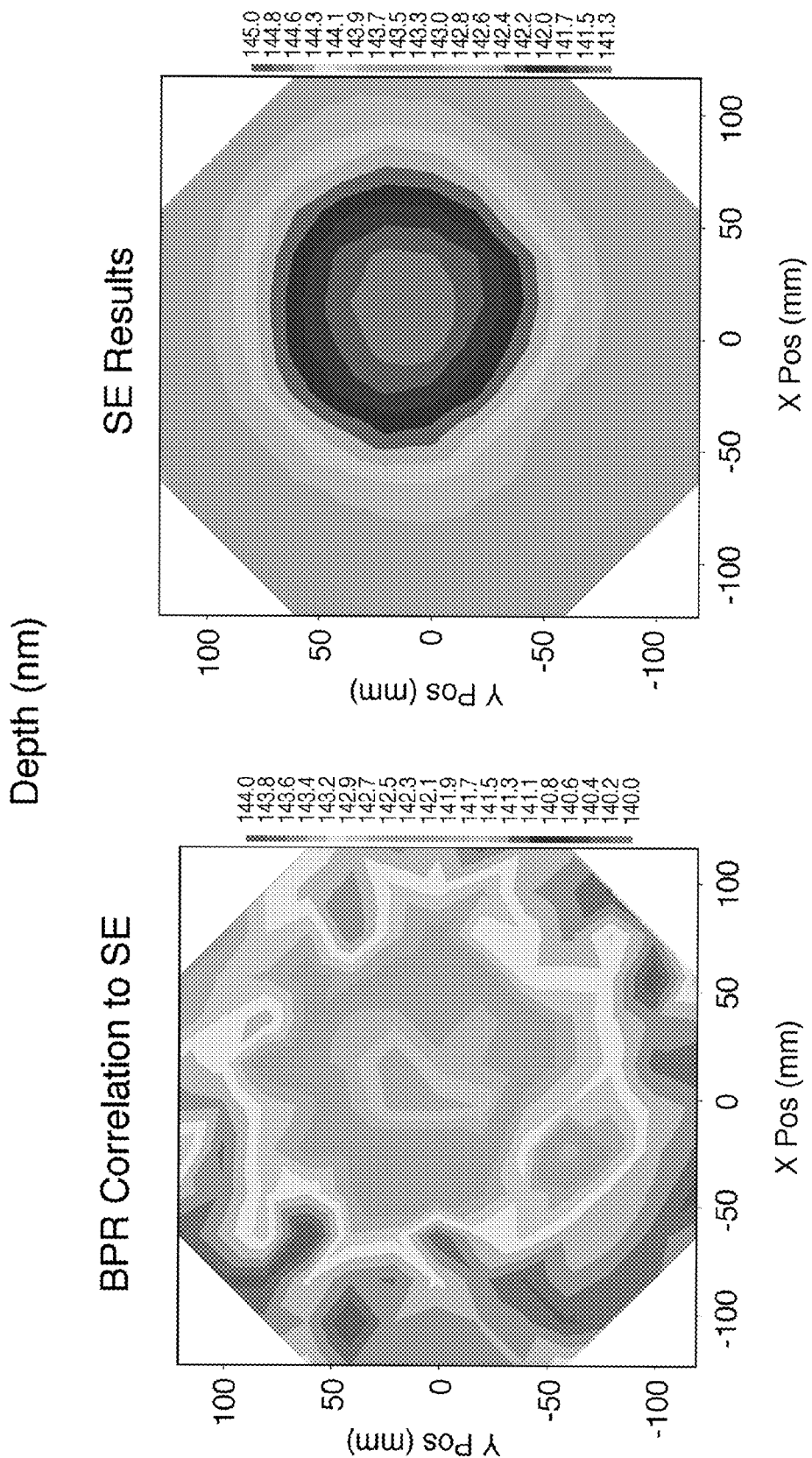

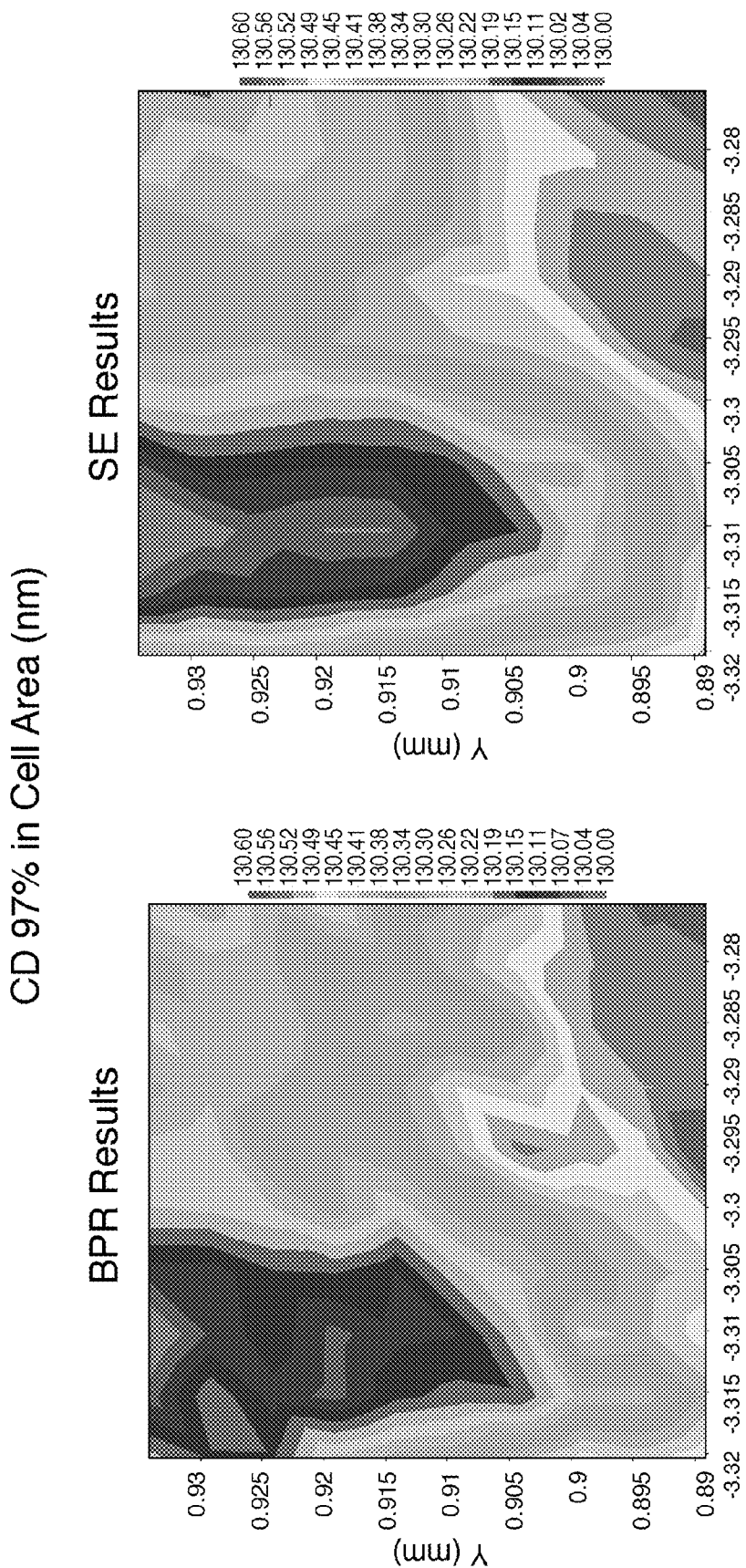

ized to a certain depth, oxygen is then introduced into the treatment vessel in step Sl4, which oxidizes the exposed silicon. In this way, silicon dioxide (SiO$_2$) is deposited onto the exposed surface of the silicon substrate.

HIGH RESOLUTION MONITORING OF CD VARIATIONS

PRIORITY

This application is a continuation of U.S. patent application Ser. No. 12/486,830, filed Jun. 18, 2009, which in turn is a continuation of U.S. patent application Ser. No 11/657,359, filed Jan. 24, 2007, which in turn claims priority to prior provisional applications Ser. No. 60/764,701, filed Feb. 2, 2006, and Ser. No. 60/850,603, filed Oct. 10, 2006, both of which are incorporated by reference.

TECHNICAL FIELD

The subject invention relates generally to optical methods for inspecting and analyzing semiconductor wafers and other samples. In particular, the subject invention relates to optical metrology system for thin films and critical dimension (CD) measurements.

BACKGROUND

Semiconductor memory chips are formed as a plurality of dies on a wafer. Within each die, there are typically a large number of repeating structures (e.g. lines). In contrast, microprocessors formed on semiconductor wafers generally do not exhibit this type of repeating structures (except, for example, in certain regions allocated to microprocessor memory).

As device sizes continue to shrink, memory manufacturers are continuing to seek methods for measuring the uniformity of the repeating structures. A typical memory die could have dimensions in the range of about 120×120 microns (box size). A goal of the manufacturer is to obtain as many as 10,000 measurements within this box to determine uniformity of the film parameters and the structure geometry (critical dimensions). These measurements must evaluate uniformity on the scale of a micron or less.

One existing device for measuring optical properties of semiconductors is sold by Therma-Wave under the trademark Opti-Probe. This device includes many different non-destructive optical metrology technologies including Beam Profile Reflectometer (BPR), Beam Profile Ellipsometer (BPE), broadband reflectometry (BB) and spectroscopic ellipsometry (SE). BPR and BPE techniques are capable of measuring small spots (~one micron or less) since they use a highly focused single wavelength laser output for a probe beam. In contrast, the BB and SE systems, which rely on a broadband source to generate the probe beam, have larger spot sizes, on the order of 15 microns.

None of these systems, if used alone, currently can provide the measurement results requested by the memory manufacturers. As can be appreciated, the BB and SE systems, while providing very accurate information, will produce an average measurement over their larger spot size. This average measurement does not have enough spatial resolution to satisfy the demands of the manufacturers. The BPR and BPE systems do provide sufficient resolution for measurement. However, the BPR and BPE systems produce a much smaller set of measurement data making the calculation of thin film and CD parameters quite difficult from these measurements alone. In addition, given the large number of requested measurement points, performing complex regressions for each of the measurement points would take a quite a long time, longer than would be acceptable to the manufacturers.

Therefore, it would be desirable to provide a measurement system which can rapidly obtain high-resolution measurements to permit evaluation of the uniformity of the semiconductor processing within small regions on the wafer.

SUMMARY OF THE INVENTION

The subject invention provides a measurement approach which generates information about parameter uniformity with high resolution and at an acceptable speed (throughput). To achieve this goal, a set of first measurements are made on a calibration sample or samples. The first measurements are made with a metrology technology capable of providing highly accurate and specific information about the film parameters and CD geometries. In a preferred embodiment, these measurements are made with a spectroscopic technology such as broadband reflectometry or spectroscopic ellipsometry. As noted above, these technologies have a relatively larger spot size and thus will produce measurements corresponding to the average parameters within the region. Average thin film and CD parameters are calculated using conventional modeling techniques.

The calibration samples are also measured using a separate, high spatial resolution metrology technique. In a preferred embodiment, these measurements are obtained with a small spot, laser based probe technique such as BPR or BPE. More specifically, a set of multiple BPR or BPE measurements (say 10 or more) are made over the area spanned by the broadband beam spot. The multiple BPR or BPE measurements are averaged. These values are then used to set up a correlation table relating the laser-based measurements to the calibration sample parameters in the same region as determined from the broadband measurements.

Once the correlation table is configured, test samples can be measured. More specifically, the region of interest (e.g. in die memory) is measured at multiple locations with the laser-based technology. Sample parameters are determined at each measurement point with reference to the calibration table. This information can be stored and used to analyze the uniformity of the sample parameters within the region. In addition, the generated values can be used to create two dimensional wafer maps which illustrate the variations of the parameters in the measured region. The parameter results can be used in other conventional ways, such as in a feedback loop to control the process or in a feed forward technique which can be used downstream to correct any noted process deviations.

Typically, the optical reflectivity signals obtained from the measurements on the test sample will not match any of the values in the table. Accordingly, the values of the sample parameters can be derived using any conventional interpolation algorithm (such as spline functions) to improve the correlation match.

In a preferred embodiment discussed in greater detail below, a neural network can be used for correlation. In this method, values from calibration measurements obtained from both technologies are used to train and validate a neural network. Values obtained from the test wafers are then input into the network to produce parameter values. The neural network approach is advantageous since it is very fast and adaptive.

Further objects and advantages of the subject invention will become apparent based on the following detailed description taken in conjunction with the drawings in which:

BRIEF DESCRIPTION OF THE DRAWINGS

FIGS. 13a and 13b are wafer maps comparing BPR and SE measurements of recess depth.

FIGS. 20a and 20b are wafer maps comparing BPR and SE measurements of CD width obtained within a cell area.

DETAILED DESCRIPTION OF THE PREFERRED EMBODIMENT

The metrology industry currently markets tools having more than one type of measurement module on a single platform. The assignees herein market such a device under the name Opti-Probe. This tool is advantageous in that it includes both broadband and laser based metrology technologies. The subject invention can be implemented on this type of tool. The discussion of this particular tool is for illustrative purposes only and should not be limiting. For example, the multiple measurements associated with the subject method could be performed with separate tools rather than a combination tool. Of course, the calibration measurement could be performed with one tool and the test phase measurements performed with a different tool. Using a composite tool for all the measurements can improve accuracy.

Figure 1:
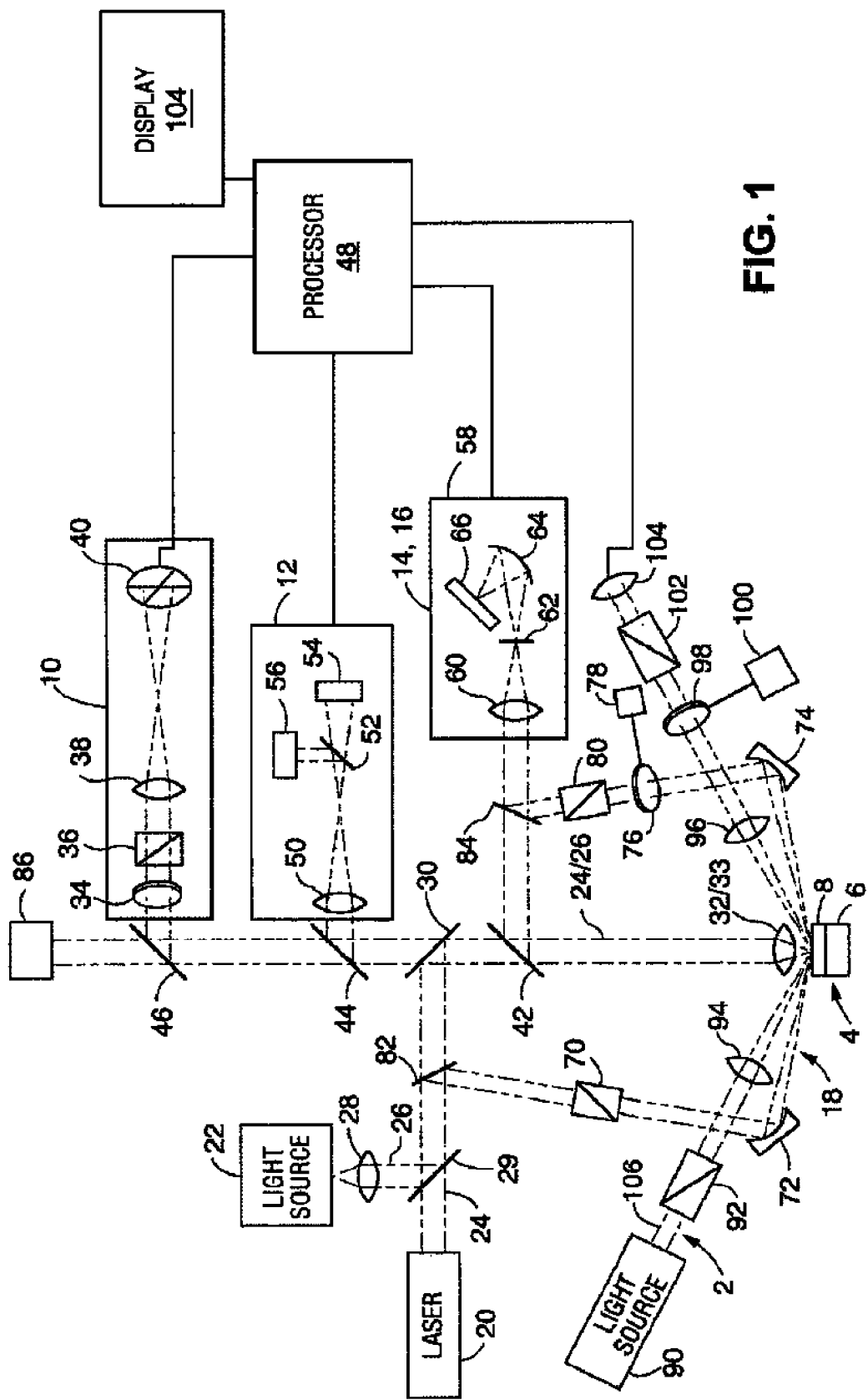
FIG. 1 is a schematic diagram of a composite metrology tool that can be used to implement the method of the subject invention.

The basic configuration of this tool is illustrated in FIG. 1. More complete details about this tool can be found in U.S. Pat. No. 6,278,519 incorporated herein by reference. The elements of the device are described briefly herein.

The apparatus of FIG. 1 includes five different non-contact optical measurement devices as well as a narrow band, off-axis ellipsometer 2 for measuring a sample 4 including a substrate 6 and a region 8 of repeating structures as would be present in a typical memory die. The composite optical measurement system includes a Beam Profile Ellipsometer (BPE) 10, a Beam Profile Reflectometer (BPR) 12, a Broadband Reflective Spectrometer (BRS) 14, a Deep Ultra Violet Reflective Spectrometer (DUV) 16, and a Broadband Spectroscopic Ellipsometer (BSE) 18. These five optical measurement devices utilize as few as two optical sources: laser 20 and light source 22. Laser 20 generates a probe beam 24, and light source 22 generates probe beam 26 (which is collimated by lens 28 and directed along the same path as probe beam 24 by minor 29). Laser 20 ideally is a solid-state laser diode which emits a linearly polarized beam. Light source 22 is ideally a combination of two lamps, deuterium and tungsten or Xenon bulb, that produces a polychromatic beam that covers a spectrum of 190 nm to 820 nm. The probe beams 24/26 are reflected by mirror 30, and pass through minor 42 to sample 4.

The probe beams 24/26 are focused onto the surface of the sample with a lens 32 or lens 33. In the preferred embodiment, two lenses 32/33 are mounted in a turret (not shown) and are alternatively movable into the path of probe beams 24/26. Lens 32 is a spherical, microscope objective lens with a high numerical aperture (on the order of 0.90 NA) to create a large spread of angles of incidence with respect to the sample surface, and to create a spot size of about one micron in diameter. Lens 33 is a reflective lens having a lower numerical aperture (on the order of 0.4 NA) and capable of focusing deep UV light to a spot size of about 10 to 15 microns.

Beam profile ellipsometry (BPE) is discussed in U.S. Pat. No. 5,181,080, issued Jan. 19, 1993, which is commonly owned by the present assignee and is incorporated herein by reference. BPE 10 includes a quarter wave plate 34, polarizer 36, lens 38 and a detector 40. In operation, linearly polarized probe beam 24 is focused onto sample 4 by lens 32. Light reflected from the sample surface passes up through lens 32, through minors 42, 30 and 44, and directed into BPE 10 by minor 46. The position of the rays within the reflected probe beam corresponds to specific angles of incidence with respect to the sample's surface. Quarter-wave plate 34 retards the phase of one of the polarization states of the beam by 90 degrees. Linear polarizer 36 causes the two polarization states of the beam to interfere with each other. For maximum signal, the axis of the polarizer 36 should be oriented at an angle of 45 degrees with respect to the fast and slow axis of the quarter-wave plate 34. Detector 40 is a quad-cell detector with four radially disposed quadrants that each intercept one quarter of the probe beam and generate a separate output signal proportional to the power of the portion of the probe beam striking that quadrant. The output signals from each quadrant are sent to a processor 48. As discussed in the U.S. Pat. No. 5,181,080 patent, by monitoring the change in the polarization state of the beam, ellipsometric information, such as $\psi$ and $\Delta$, can be determined. To determine this information, the processor 48 takes the difference between the sums of the output signals of diametrically opposed quadrants, a value which varies linearly with film thickness for very thin films. This analysis is sometimes referred to herein as the "diff" signal. Adding the output from the four quadrants is referred to as the "sum" signal which can also provide useful information.

Beam profile reflectometry (BPR) is discussed in U.S. Pat. No. 4,999,014, issued on Mar. 12, 1991, which is commonly owned by the present assignee and is incorporated herein by reference. BPR 12 includes a lens 50, beam splitter 52 and two linear detector arrays 54 and 56 to measure the reflectance of the sample. In operation, linearly polarized probe beam 24 is focused onto sample 4 by lens 32, with various rays within the beam striking the sample surface at a range of angles of incidence. Light reflected from the sample surface passes up through lens 32, through minors 42 and 30, and directed into BPR 12 by mirror 44. The position of the rays within the reflected probe beam corresponds to specific angles of incidence with respect to the sample's surface. Lens 50 spatially spreads the beam two-dimensionally. Beam splitter 52 separates the S and P components of the beam, and detector arrays 54 and 56 are oriented orthogonal to each other to isolate information about S and P polarized light. The higher angles of incidence rays will fall closer to the opposed ends of the arrays. The output from each element in the diode arrays will correspond to different angles of incidence. Detector arrays 54/56 measure the intensity across the reflected probe beam as a function of the angle of incidence with respect to the sample surface. The processor 48 receives the output of the detector arrays 54/56.

Broadband reflective spectrometer (BRS) 14 simultaneously probes the sample 4 at normal incidence with multiple wavelengths of light. BRS 14 uses lens 32 and includes a broadband spectrometer 58 which can be of any type commonly known and used in the prior art. The spectrometer 58 shown in FIG. 1 includes a lens 60, aperture 62, dispersive element 64 and detector array 66. During operation, probe beam 26 from light source 22 is focused onto sample 4 by lens 32. Light reflected from the surface of the sample passes up through lens 32, and is directed by minor 42 (through mirror 84) to spectrometer 58. The lens 60 focuses the probe beam through aperture 62, which defines a spot in the field of view on the sample surface to analyze. Dispersive element 64, such as a diffraction grating, prism or holographic plate, angularly disperses the beam as a function of wavelength to individual detector elements contained in the detector array 66. The different detector elements measure the optical intensities (magnitude) of the different wavelengths of light contained in the probe beam, preferably simultaneously. Alternately, detector 66 can be a CCD camera, or a photomultiplier with suitably dispersive or otherwise wavelength selective optics. It should be noted that a monochrometer could be used to measure the different wavelengths serially (one wavelength at a time) using a single detector element. Further, dispersive element 64 can also be configured to disperse the light as a function of wavelength in one direction, and as a function of the angle of incidence with respect to the sample surface in an orthogonal direction, so that simultaneous measurements as a function of both wavelength and angle of incidence are possible. Processor 48 processes the intensity information measured by the detector array 66.

Deep ultra violet reflective spectrometry (DUV) simultaneously probes the sample with multiple wavelengths of ultra-violet light. DUV 16 uses the same spectrometer 58 to analyze probe beam 26 as BRS 14, except that DUV 16 uses the reflective lens 33 instead of focusing lens 32. To operate DUV 16, the turret containing lenses 32/33 is rotated so that reflective lens 33 is aligned in probe beam 26. The reflective lens 33 is necessary because solid objective lenses cannot sufficiently focus the UV light onto the sample.

Broadband spectroscopic ellipsometry (BSE) is discussed in U.S. Pat. No. 5,877,859, issued Mar. 2, 1999, which is commonly owned by the present assignee and is incorporated herein by reference. BSE (18) includes a polarizer 70, focusing mirror 72, collimating mirror 74, rotating compensator 76, and analyzer 80. In operation, mirror 82 directs at least part of probe beam 26 to polarizer 70, which creates a known polarization state for the probe beam, preferably a linear polarization. Mirror 72 focuses the beam onto the sample surface at an oblique angle, ideally on the order of 70 degrees to the normal of the sample surface. Based upon well-known ellipsometric principles, the reflected beam will generally have a mixed linear and circular polarization state after interacting with the sample, based upon the composition and thickness of the sample's film 8 and substrate 6. The reflected beam is collimated by minor 74, which directs the beam to the rotating compensator 76. Compensator 76 introduces a relative phase delay $\delta$ (phase retardation) between a pair of mutually orthogonal polarized optical beam components. Compensator 76 is rotated (continuously or stepped) about an axis substantially parallel to the propagation direction of the beam, preferably by an electric motor 78. Analyzer 80, preferably another linear polarizer, mixes the polarization states incident on it. By measuring the light transmitted by analyzer 80, the polarization state of the reflected probe beam can be determined. Mirror 84 directs the beam to spectrometer 58, which simultaneously measures the intensities of the different wavelengths of light in the reflected probe beam that pass through the compensator/analyzer combination. Processor 48 receives the output of the detector 66, and processes the intensity information measured by the detector 66 as a function of wavelength and as a function of the azimuth (rotational) angle of the compensator 76 about its axis of rotation, to solve the ellipsometric values $\psi$ and $\Delta$ as described in U.S. Pat. No. 5,877,859. Detector/camera 86 is positioned above mirror 46, and can be used to view reflected beams off of the sample 4 for alignment and focus purposes.

The commercial Opti-probe also includes a narrow-band ellipsometer 2. Ellipsometer 2 includes a light source 90 that produces a quasi-monochromatic probe beam 106 having a known stable wavelength and stable intensity. Preferably, this result is achieved passively, where light source 90 generates a very stable output wavelength which does not vary over time (i.e. varies less than 1%). Examples of passively stable light sources are a helium-neon laser, or other gas discharge laser systems.

The beam 106 interacts with polarizer 92 to create a known polarization state. In the preferred embodiment, polarizer 92 is a linear polarizer made from a quartz Rochon prism, but in general the polarization does not necessarily have to be linear, nor even complete. Polarizer 92 can also be made from calcite. The azimuth angle of polarizer 92 is oriented so that the plane of the electric vector associated with the linearly polarized beam exiting from the polarizer 92 is at a known angle with respect to the plane of incidence (defined by the propagation direction of the beam 106 and the normal to the surface of sample 4). The azimuth angle is preferably selected to be on the order of 30 degrees because the sensitivity is optimized when the reflected intensities of the P and S polarized components are approximately balanced. It should be noted that polarizer 92 can be omitted if the light source 90 emits light with the desired known polarization state.

The beam 106 is focused onto the sample 4 by lens 94 at an oblique angle. The beam 106 is ideally incident on sample 4 at an angle on the order of 70 degrees to the normal of the sample surface because sensitivity to sample properties is maximized in the vicinity of the Brewster or pseudo-Brewster angle of a material. Based upon well-known ellipsometric principles, the reflected beam will generally have a mixed linear and circular polarization state after interacting with the sample, as compared to the linear polarization state of the incoming beam. Lens 96 collimates beam 106 after its reflection off of the sample 4.

The beam 106 then passes through the rotating compensator (retarder) 98, which introduces a relative phase delay δ (phase retardation) between a pair of mutually orthogonal polarized optical beam components. The amount of phase retardation is a function of the wavelength, the dispersion characteristics of the material used to form the compensator, and the thickness of the compensator. Compensator 98 is rotated (stepped or continuously) about an axis substantially parallel to the propagation direction of beam 106, preferably by an electric motor 100. Compensator 98 can be any conventional wave-plate compensator, for example those made of crystal quartz. The thickness and material of the compensator 98 are selected such that a desired phase retardation of the beam is induced. Beam 106 then interacts with analyzer 102, which serves to mix the polarization states incident on it. In this embodiment, analyzer 102 is another linear polarizer, preferably oriented at an azimuth angle of 45 degrees relative to the plane of incidence. The rotating compensator 98 changes the polarization state of the beam as it rotates.

Beam 106 then enters detector 104, which measures the intensity of the beam passing through the compensator/analyzer combination. The processor 48 processes the intensity information measured by the detector 104 to determine the polarization state of the light after interacting with the analyzer, and therefore the ellipsometric parameters of the sample. This information processing includes measuring beam intensity as a function of the azimuth (rotational) angle of the compensator about its axis of rotation.

The output of the processor can be supplied to a display 110 which can display parameters in various forms including two-dimensional maps. The output can be stored. The term stored or storage merely means that the data is in a form for future use, even if that use is immediate and the storage time is very short. This data can be transferred to another memory or onto a computer network. The output could be used in various feedback or feed forward control systems.

The metrology tool described above can be used to obtain high spatial resolution measurements within small regions on the semiconductor which include repeating structures such as found in memory chips. These devices have features such as repeating gate structures formed on the substrate. The BPR and BPE technologies generate probe beam spot sizes on the order of one micron in diameter. Such a small spot size will still overlap a number of repeating lines so that light diffraction patterns will be created.

Figure 2:
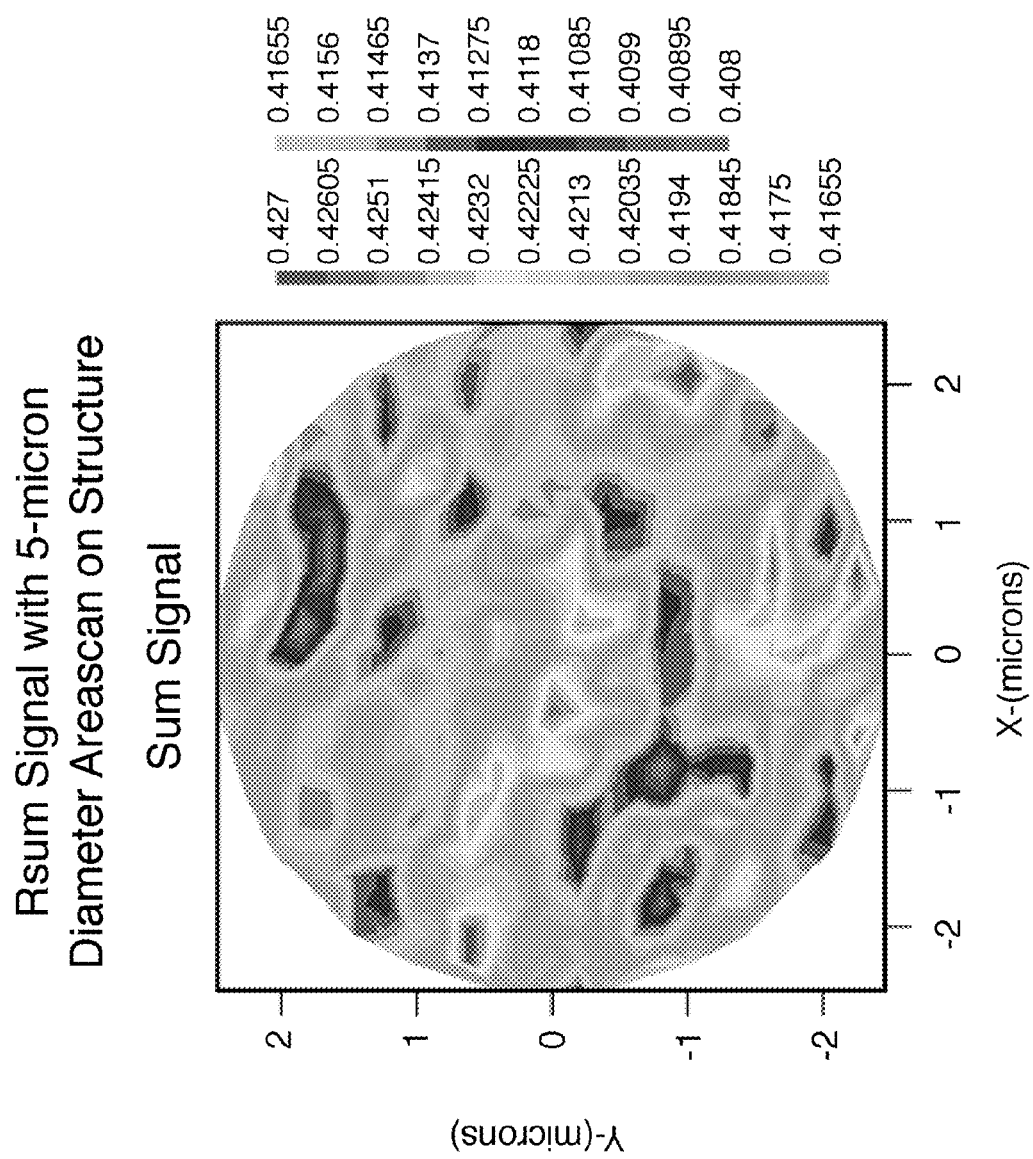
FIG. 2 is a map of the variations apparent in the sum signal generated by the detector in a beam profile ellipsometer when the probe beam having a one-micron spot diameter is scanned over a five-micron region on a semiconductor sample.
Figure 3:
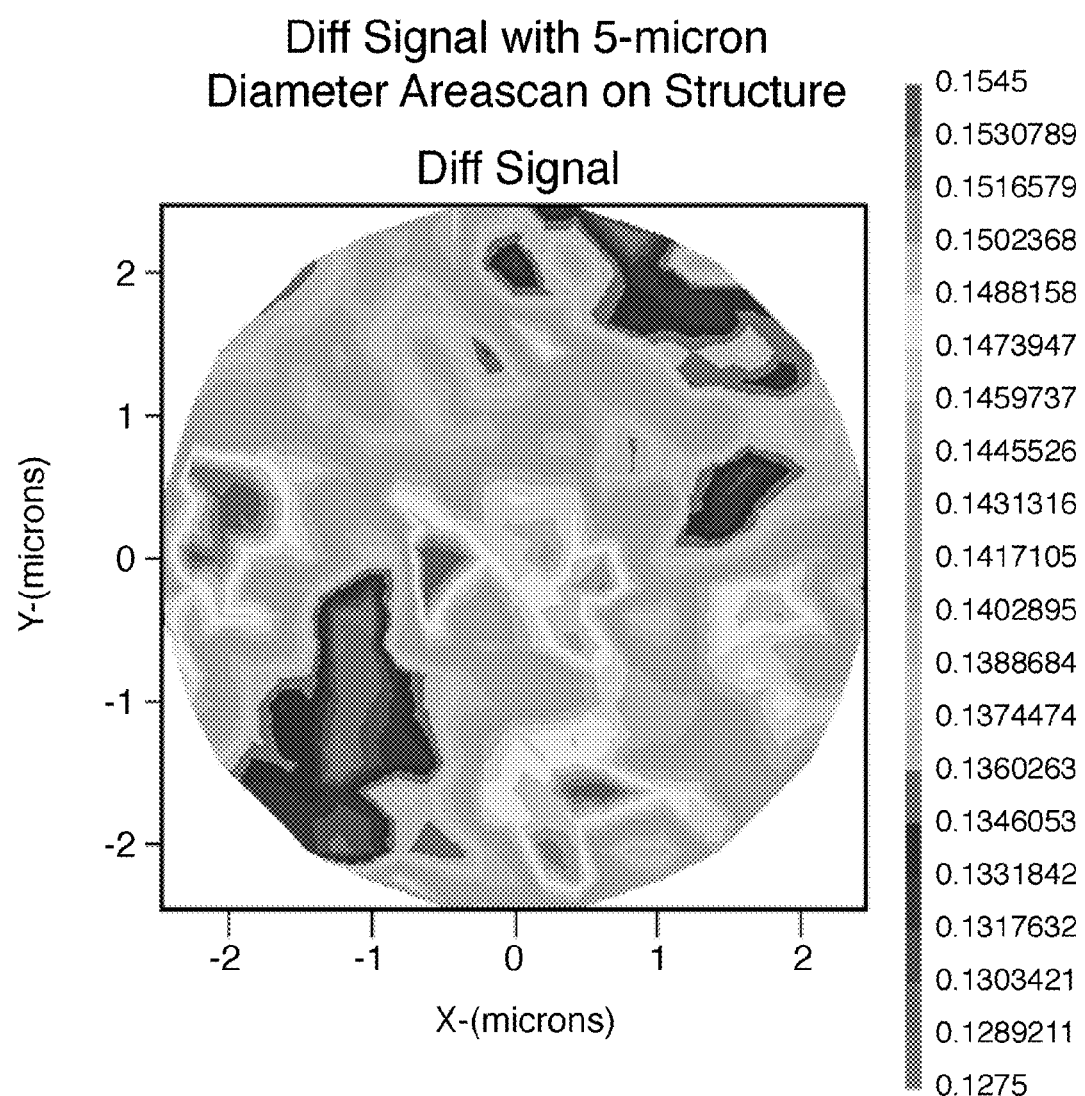
FIG. 3 is a map of the variations apparent in the "diff" (difference) signal generated by the detector in a beam profile ellipsometer when the probe beam having a one-micron spot diameter is scanned over a five-micron region on a semiconductor sample.

In some initial experiments, the probe beam of the BPE technology was scanned within a 120 by 120 micron size box with a poly gate structure having a 360 nm pitch. FIG. 2 illustrates the variation in the BPE sum signal while FIG. 3 illustrates the variation in the BPE diff signal. These Figures demonstrate the ability of the BPE measurement tool to differentiate non-uniformities within a very small region. In the current Opti-Probe, such measurements can be taken in about 0.5 seconds each so relatively high throughput can be achieved.

As noted above, the structures within a memory cell are relatively complex, including a number of layers and physical structures (CD's) having variation in spacing (pitch), sidewall shape, depth, etc. The amount of information available from the single wavelength BPR and BPE measurements is much less than is available with broadband spectroscopic measurements and therefore it is more difficult to determine full structural parameters using state of the art modeling techniques.

In a modeling algorithm, a mathematical model is created which defines a representation of the physical structure of the sample (layers materials, thicknesses, indices of refraction, line spacing, line shape etc.). Various expected parameters are fed into the model and using Maxwell's equations, the expected optical responses are generated. When the sample is measured, the actual optical response is compared to the model generated (theoretical) optical response. The model generated optical responses can be in the form of a library or can be generated in a real time regression. In either case, the algorithm attempts to match the actual measured data with the theoretical model generated data. When a suitable match is found, it is assumed that the properties of the sample match the properties used to generate that particular set of theoretical optical data.

Examples of modeling used with semiconductor metrology systems can be found in the following U.S. Patents which are incorporated herein by reference. U.S Pat. Nos. 6,704,661; 6,768,967; 6,867,866; 6,898,596; 6,919,964; 7,069,153; and 7,145,664.

In order to obtain specific parameter information regarding the test samples, it is necessary to generate calibration information using a technology other than the one which will be used to measure the test samples. Preferably, the other technology generates more information content, such as in a broadband spectroscopic technique.

Therefore, in accordance with the subject invention, calibration information is generated by measuring calibration samples. Calibration samples can be defined by multiple regions on a single wafer, multiple wafers or both. Preferably, the calibration samples will span a range of possible parameter and process variations. Each of these calibration samples is measured with at least one high information content technology, such as broadband spectroscopy or broadband ellipsometry. These measurement technologies have a spot size on the order of 15 microns and return a response indicative of the average parameters in the region. The average parameters can be determined by any of the known modeling approaches used in the prior art including libraries, real time analysis, etc.

In accordance with the subject invention, the calibration samples are also measured by the high spatial resolution technology that will be used to characterize the test sample, for example either (or both) of the BPR and BPE technologies. Since the laser technologies provide local information and that local information varies, it is preferable when making the calibration measurements to scan the laser beam to take multiple measurements which can be averaged. The average measurement essentially provides a spatial average of the conditions and the results should then correspond more closely to the values that will be obtained from the larger spot measurement technology. In some initial experiments, it was found that ten to fifteen measurements made over the area spanned by the large beam spot in the calibration zones provided sufficient spatial averaging to achieve accurate results.

The averaged small spot measurements are then correlated with the sample parameters derived from the large spot measurements. In the basic approach, a correlation table is created. Thereafter, when the test samples are being measured, the signals from the small spot measurements are compared to the table to determine the parameters of the sample. Interpolation algorithms can be used to extract parameters at data points not found in the table. A preferred neural network correlation technique is discussed below.

As noted above, in the preferred embodiment, the high spatial resolution measurements are performed with one of the assignee's proprietary BPR and/or BPE techniques. These technologies have evolved over the years to include various other detector configurations, laser wavelengths, etc. all of which can be used with the subject invention. Such devices might also be suitable for use in obtaining the calibration measurements. The following U.S. Patents discuss BPR and BPE related approaches and are incorporated herein by reference: U.S. Pat. Nos. 5,042,951; 5,412,473; 6,678,046; 6,429,943; 6,813,034 6,798,511; 7,061,627 and 2006/0103844. For example, U.S. Pat. No. 6,678,046 discloses that a detector having a two dimensional array of detector elements (see FIG. 6) would be useful for measuring angle of incidence information from physical structures at different planes of incidence of the probe laser beam.

Small spot sensitivity has also been demonstrated with a large spot detection system. Mores specifically, and as described in U.S. Pat. No. 6,952,261 (incorporated by reference), a broadband probe beam illuminates the sample, typically with a larger spot size. An intensity modulated laser beam is focused to a micron size spot within the larger broadband spot. A detector monitors the reflected intensity of the broadband spot. The processor extracts the modulated changes of the broadband intensity which correspond to measurements within the small focused spot size of the modulated beam. This approach could be used with either a reflectometry or ellipsometry approach. One advantage of this approach is that the sample can be held in a fixed position with respect to the probe beam illumination and collection optics, while the pump beam spot is scanned with galvo mirrors within the probe beam spot allowing for rapid data acquisition.

The assignee herein also sells a device called the Therma-Probe which uses an intensity modulated laser pump to generate thermal and plasma waves in the sample. A laser generated probe beam monitors the modulated reflectivity of the sample induced by the modulated excitation to evaluate parameters of the sample. Such a laser system would also provide small spot measurements. U.S. Pat. No. 6,888,632, incorporated by reference, discloses the concept of using a laser modulated optical response technique for obtaining small spot scatterometry measurements. Such a small spot measurement system could be used to measure variations within a memory die.

Details about the various measurement modalities referred to herein can be obtained from a review of the following U.S. Patents and Patent Applications, each of which is incorporated by reference. U.S. Pat. Nos. 4,999,014; 5,042,951; 5,181,080; 5,412,473; 5,877,859, 6,278,519; 6,678,046; 6,798,511; 7,061,627 and 7,046,376.

As noted above, in its basic form, the uniformity of the test wafers is measured by scanning the small spot probe beam of a laser based metrology technology across the memory cell and recording changes in the output signals. These signals are compared to correlated calibration information to derive the parameter of interest (e.g. poly thickness, line width, etc.). The correlated calibration information is created by measuring calibration samples with at least two metrology technologies—the high spatial resolution technology that will be used to subsequently measure the test samples and a second technology with greater information content. The latter technology should have sufficient information content to permit characterization of the calibration samples through conventional modeling techniques.

One skilled in the art would understand that there would be many variants to this basic approach. These variants would include adding additional measurement technologies to either or both of the calibration phase and the test measurement phase. Adding technologies can make the results more accurate and robust but usually at the expense of longer measurement and calculation times. These trade-offs are dealt with by those skilled in the art on a regular basis and are application specific.

Without intending to be limiting, some variants will be identified. For example, during the measurement phase, it might be desirable to take measurements with two different small spot technologies, such as the BPR and BPE measurements. Both of the measurements can be compared to the correlation data and the final results averaged. In this example, it is preferable that both small spot technologies be used during the initial calibration measurements so that modeling during the test measurement phase is not required.

In another example, additional technologies can be used during the calibration phase to more accurately characterize the samples. Thus, one might measure the calibration samples with both a spectroscopic ellipsometer and a spectroscopic reflectometer. Both of these measurements can be used in a common regression to determine the parameters of the calibration samples. In addition, it may also be necessary to include the results of the small spot measurement into the regression as certain features and parameters are best measured with the BPR or BPE technologies. It is within the scope of the subject invention to include these various combinations.

In a preferred embodiment, all the information obtained during the calibration phase from any of the measurement technologies can be fed into a neural network for training and validation. The use of a neural network for analysis is discussed immediately below.

Neural Network

In addition to inverse modeling discussed above, another general category of methods utilized for an accurate characterization of CD geometry is a parameter estimation technique. Examples of parameter estimation techniques include, for example, neural networks, correlation techniques and pattern recognition techniques. In the prior art, there are several examples of using neural networks for quantitative characterization of diffractive gratings and analysis of CD structures. Exemplary of this prior art materials are the following publications: R. Krukar, et al., "Reactive ion etch profile and depth characterization using statistical and neural analysis of light scattering data", J. Appl. Phys. 74, pp. 3698-3706 (1993); N. George and S.-G. Wang, "Neural networks applied to diffraction-pattern sampling", Appl. Opt. 33, pp. 3127-3134 (1994); R. H. Krukar, et al., "Using scattered light modeling for semiconductor critical dimension metrology and calibration", Proc. SPIE Vol. 1926, pp. 60-71 (1993); I. Kallioniemi, et al., "Optical scatterometry of subwavelength diffraction gratings: Neural-network approach", Appl. Opt. 37(25), pp. 5830-5835 (1998); and U.S. Pat. No. 5,867,276 to McNeil et al., all incorporated herein by reference.

In all these prior art methods, calibration (or training) of the initial set of measurement data has been performed using the results of the theoretical model and not the thin film and CD parameters themselves. This approach requires a very sophisticated, precise and unacceptably time-consuming off-line calculations in order to achieve reliable CD measurements. In addition, all the prior art methods rely on the use of a single measurement technology (single wavelength or broadband based scatterometry) coupled with the neural network data processing for CD analysis. Therefore, the prior art techniques are not taking advantage of cross-correlation between multiple CD measurement technologies and are not suitable for CD measurements in small areas within the die.

Thus, it would be desirable to use a technology alternative to the conventional theoretical modeling and capable of performing precise fast measurements of thin film and CD parameters in small areas of semiconductor product wafers.

Therefore, another aspect of the subject invention provides a method for optical metrology measurements of thin film and CD parameters using an Artificial Neural Network (ANN) algorithm. In this method, there is no need to apply any theoretical model to the test phase measurements and no knowledge about the physics of the measurements is required. The only prior knowledge that ANN calculation is using is a set of several calibration (training) values used to set up the process. It should be noted that in the preferred embodiment, the training values of the parameters are derived from a modeling approach. However, this modeling is done off line and once the training is completed, no additional modeling is necessary.

Generally, an ANN is an information processing paradigm that is inspired by the way biological nervous systems, such as the brain, process information. The key element of this paradigm is the novel structure of the information processing system. It is composed of a large number of highly interconnected processing elements (neurons) working in unison to solve specific problems. ANNs, like people, learn by example. An ANN is configured for a specific application, such as pattern recognition or data classification, through a learning process. Learning in biological systems involves adjustments to the synaptic connections that exist between the neurons.

Figure 4:
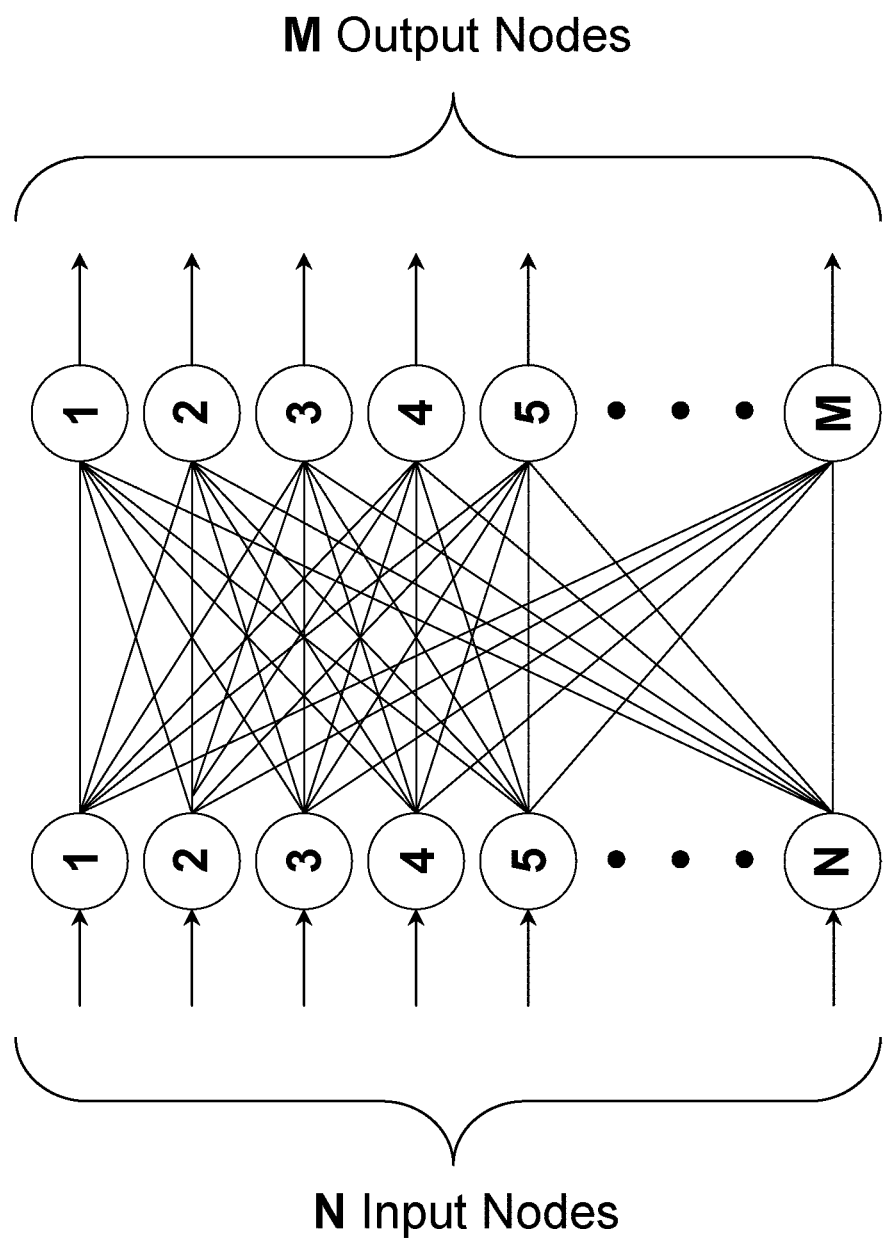
FIG. 4 is a diagram of a neural network having N input nodes and M output nodes.

In an optical metrology system, an ANN consists of N input nodes (measured data points) and M output nodes (predicted parameter values) as illustrated in FIG. 4. Between the input and output nodes, a typical ANN may have a significant number of middle steps (neurons) connected with each other with both input and output nodes.

Figure 5:
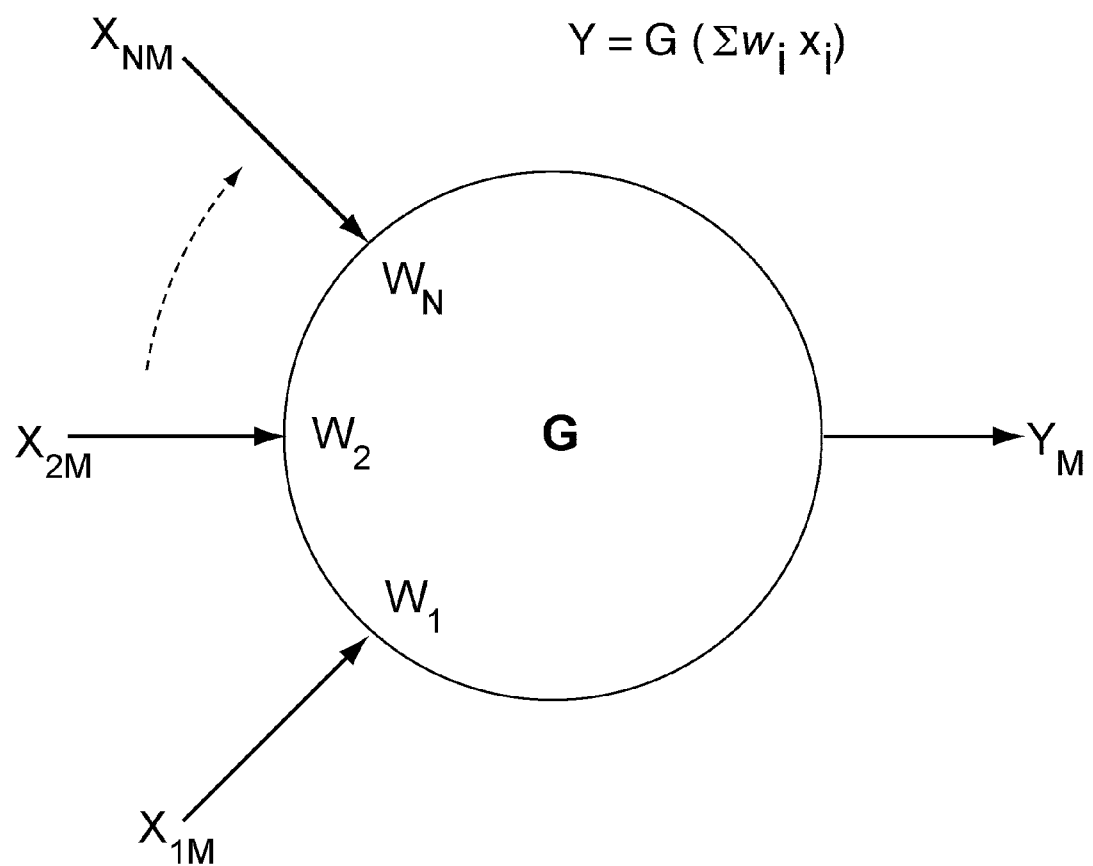
FIG. 5 is a diagram of a node of a neural network showing weighting of the inputs.

Input nodes in ANN may have different weights depending on their relative significance for the overall network. FIG. 5 shows schematically a neuron with a number of input nodes $X_{1M}$ to $X_{NM}$ and an output node $Y_M$. Here, $X_{iM}$ corresponds to the i-th input from previous layer node into the M-th node in the next layer and $Y_M$ corresponds to the output of the M-th node. Each input node may have its own weight W depending on the relative importance of the information it carries. Therefore, the output node is a set of input nodes weighted according to activation function G and input weights $W_i$. Several activation functions G may be used for these purposes, i.e. sigmoid, hyperbolic tangent, linear threshold, etc. In an optical metrology system, nodes carrying the most reliable, low noise data will have higher weights in ANN.

Figure 6:
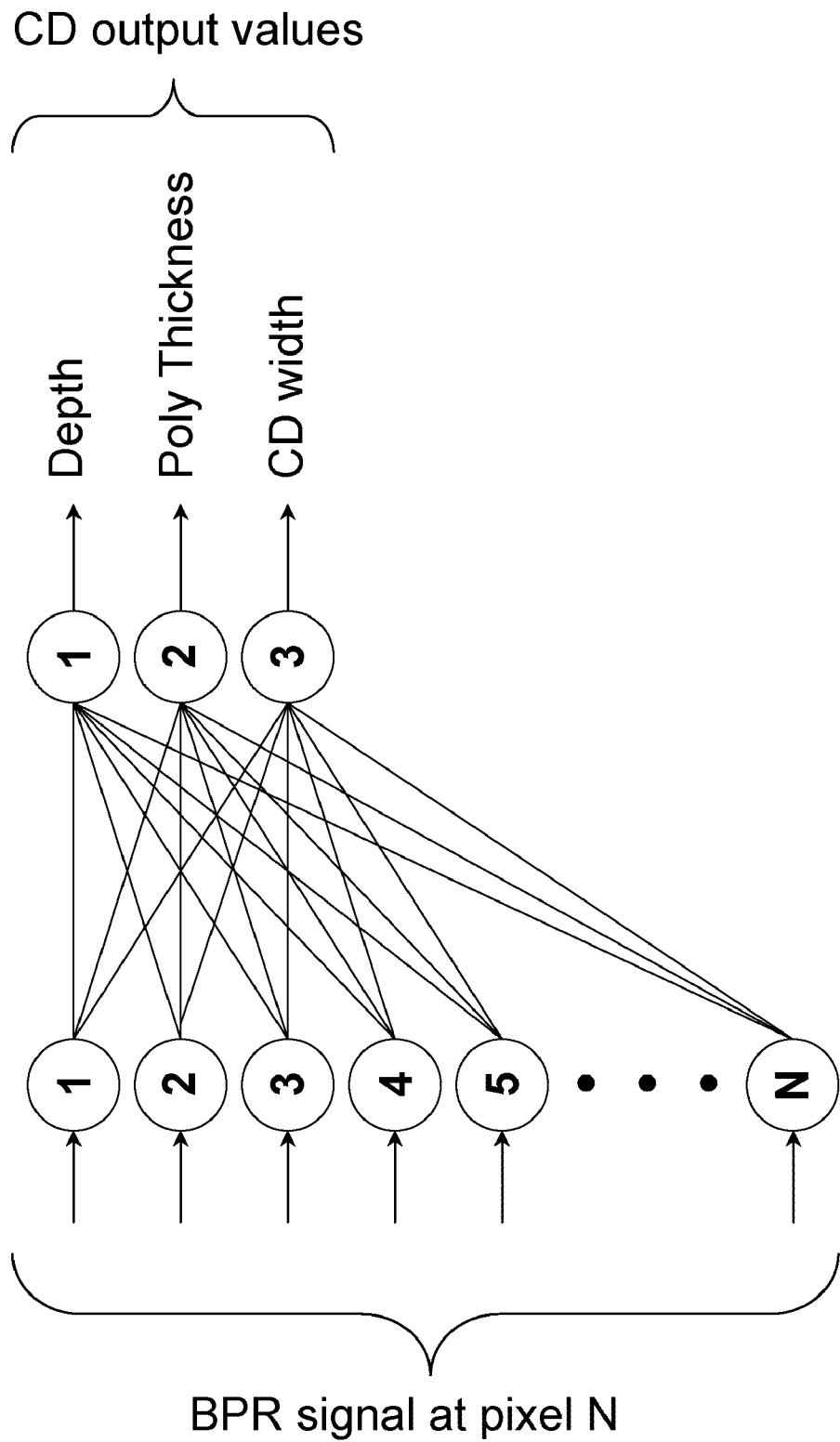
FIG. 6 is a diagram of a neural network showing input nodes carrying BPR signal information and output nodes showing predicted sample parameters.

With respect to the "in die" measurements discussed above, the method of the ANN can be applied to BPR/BPE data obtained within a small die on a semiconductor wafer provided that a set of known parameters of the thin film and CD structure obtained by a larger spot SE measurement is used to calibrate (train) the neural network. As an example, shown in FIG. 6 are N input nodes of the ANN carrying information about BPR signal recorded at each pixel of the CCD array and three output nodes (CD parameters of interest) predicted by the ANN: recess depth, poly-Si thickness, and Si CD measured at 97% of its height.

Figure 7:
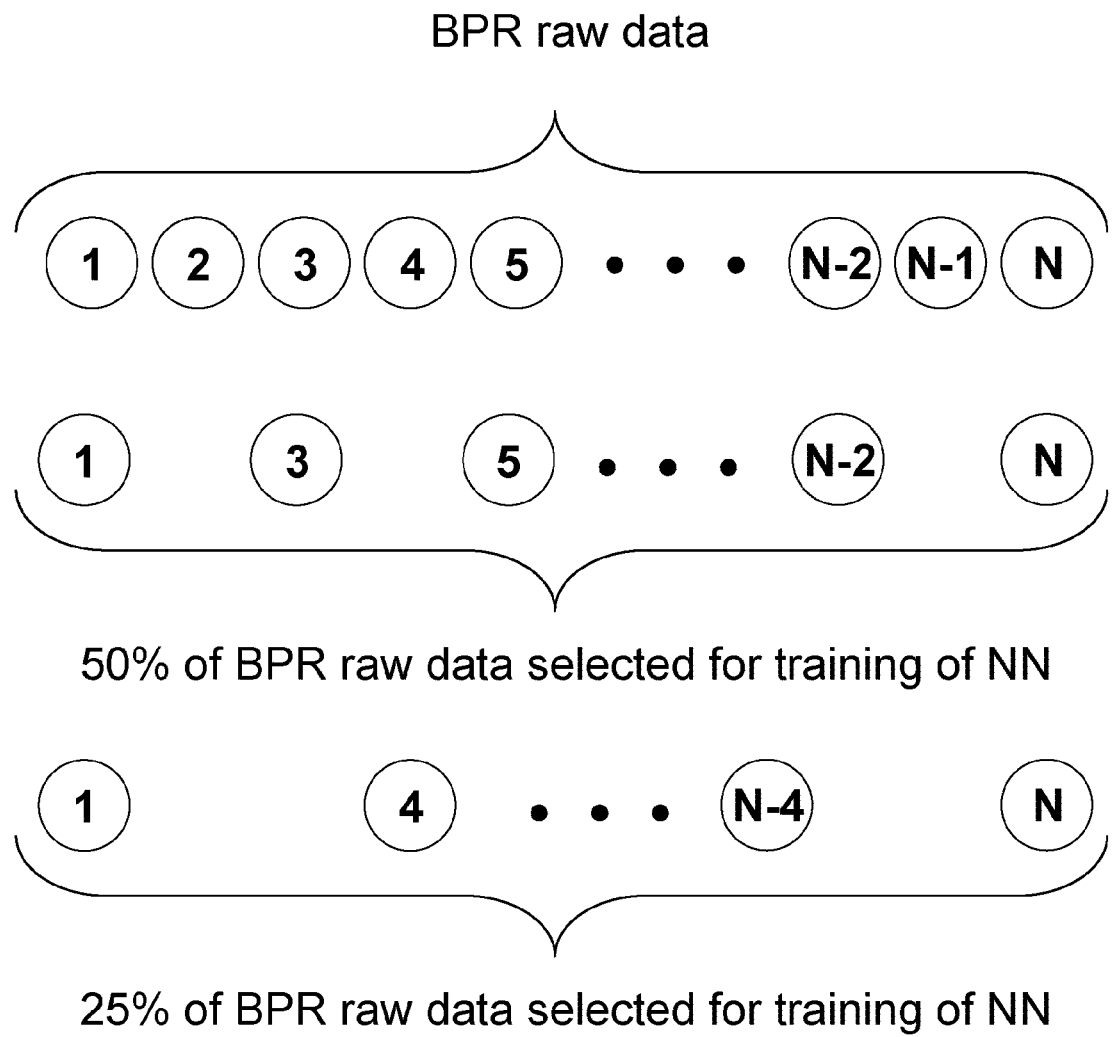
FIG. 7 is a diagram showing one possible approach for selecting data for training a neural network.

For the neural network to work, a special initial training or "learning" procedure with known values for input and output nodes should be performed. FIG. 7 shows schematically the process of data selection for the training of BPR data (N input nodes). First, a set of input nodes is selected from the pool of all BPR input nodes. As shown in FIG. 7, it may be every other input node (50% of BPR raw data) or every forth input node (25% of BPR raw data). The selected set of input values for training is entered in ANN. Then, the same number of the corresponding known output values obtained from SE measurements is selected and entered in ANN. Training of the neural network establishes correlations between the input nodes and the output nodes by connecting numerous neurons to each other in a special way and by weighing the inputs from different nodes. Optimization of an ANN uses the "back-propagation" algorithm to determine input weights for each node. Final validity of the ANN model is tested by using a remainder of initial input nodes and a remainder of the corresponding known outputs (50% and 75%, respectively in two examples shown in FIG. 7).

Figure 8:
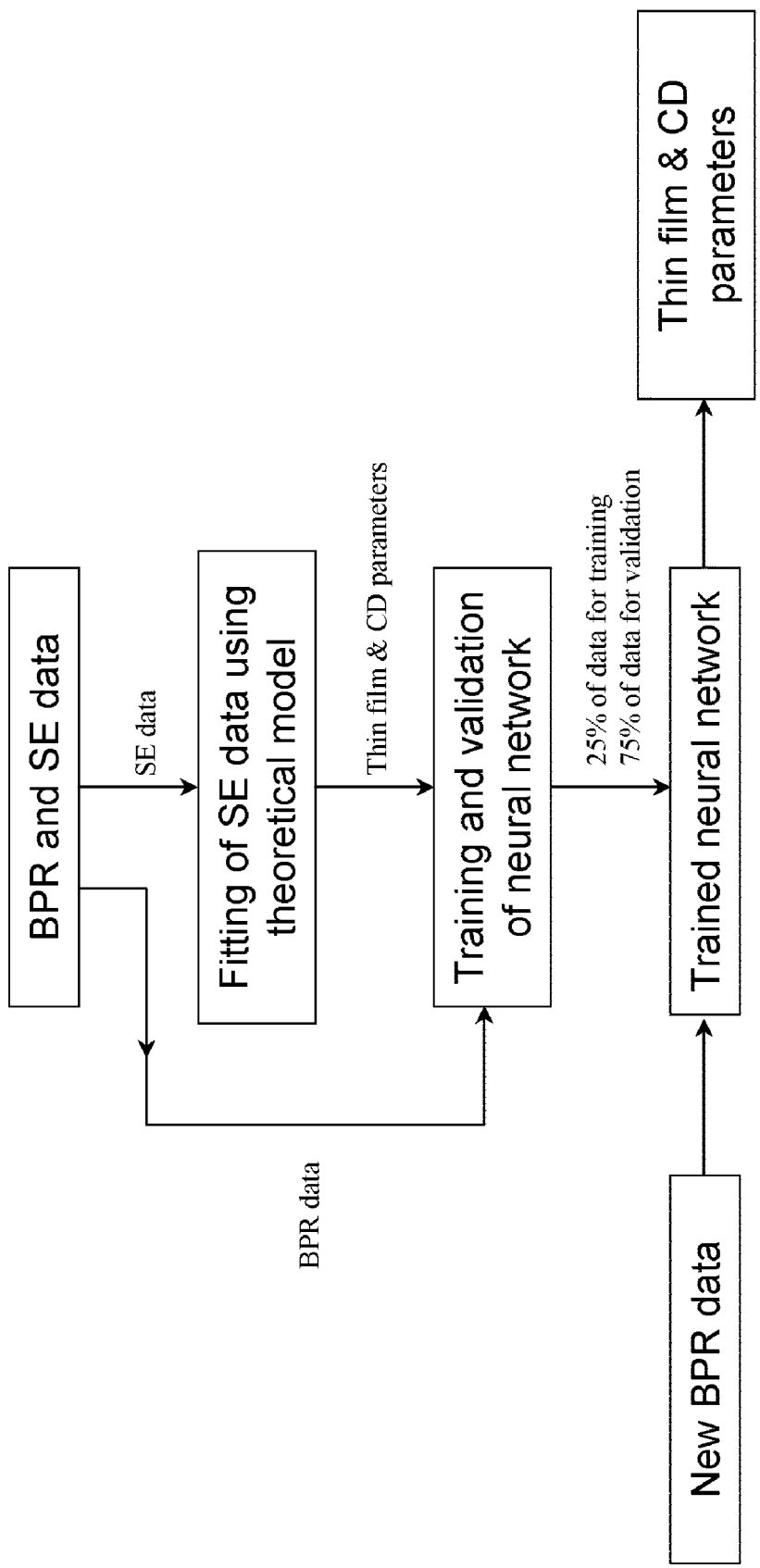
FIG. 8 is a flowchart illustrating the process of creating a trained neural network for use in association with the subject method.

Once the neural network has been trained, it can predict the output values for any set of input nodes for which the output values are unknown. Thus, the values of the thin film and CD parameters of interest can be obtained very fast without using any theoretical model. The flowchart in FIG. 8 illustrates the entire process commencing at obtaining the BPR and SE data, then training the neural network and finally predicting the output thin film and CD parameters based on experimental BPR data.

Figure 9:
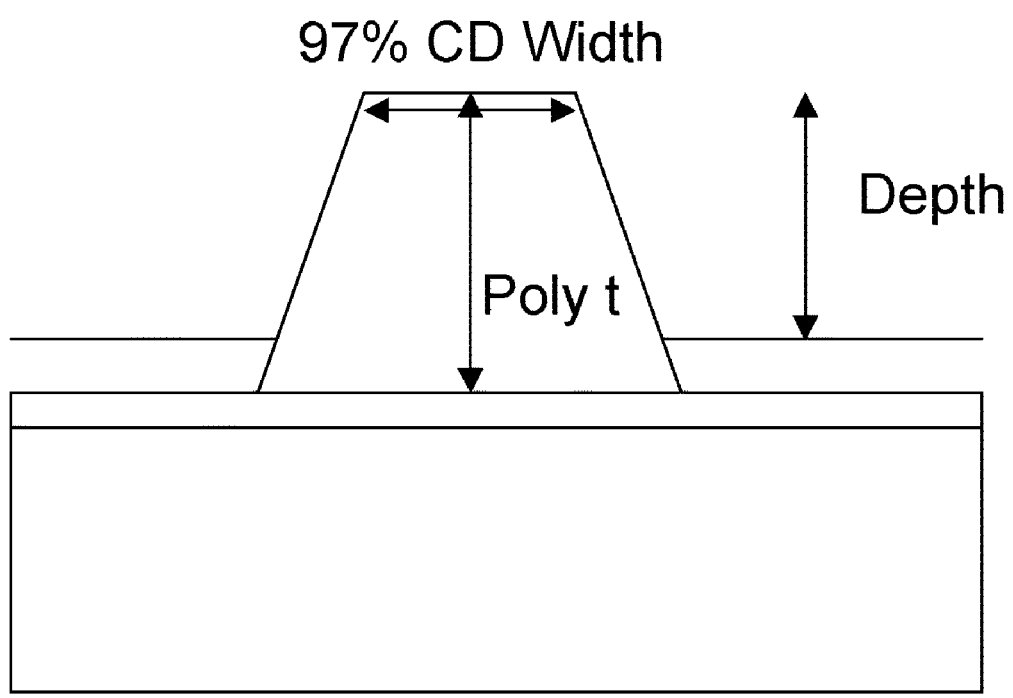
FIG. 9 is a diagram showing a CD structure used in the examples illustrated in FIGS. 10 to 20.

As an example of the capability of the ANN method, several practical applications of this powerful technique to the SE-trained BPR results are shown. FIG. 9 shows the CD structure used in these examples. FIGS. 10 to 14 show correlations between the BPR results obtained using the ANN and the conventional SE measurements taken outside a die area. FIGS. 15 to 20 show correlations between the BPR maps obtained using the ANN and the corresponding SE maps derived from measurements within a die area.

Figure 10:
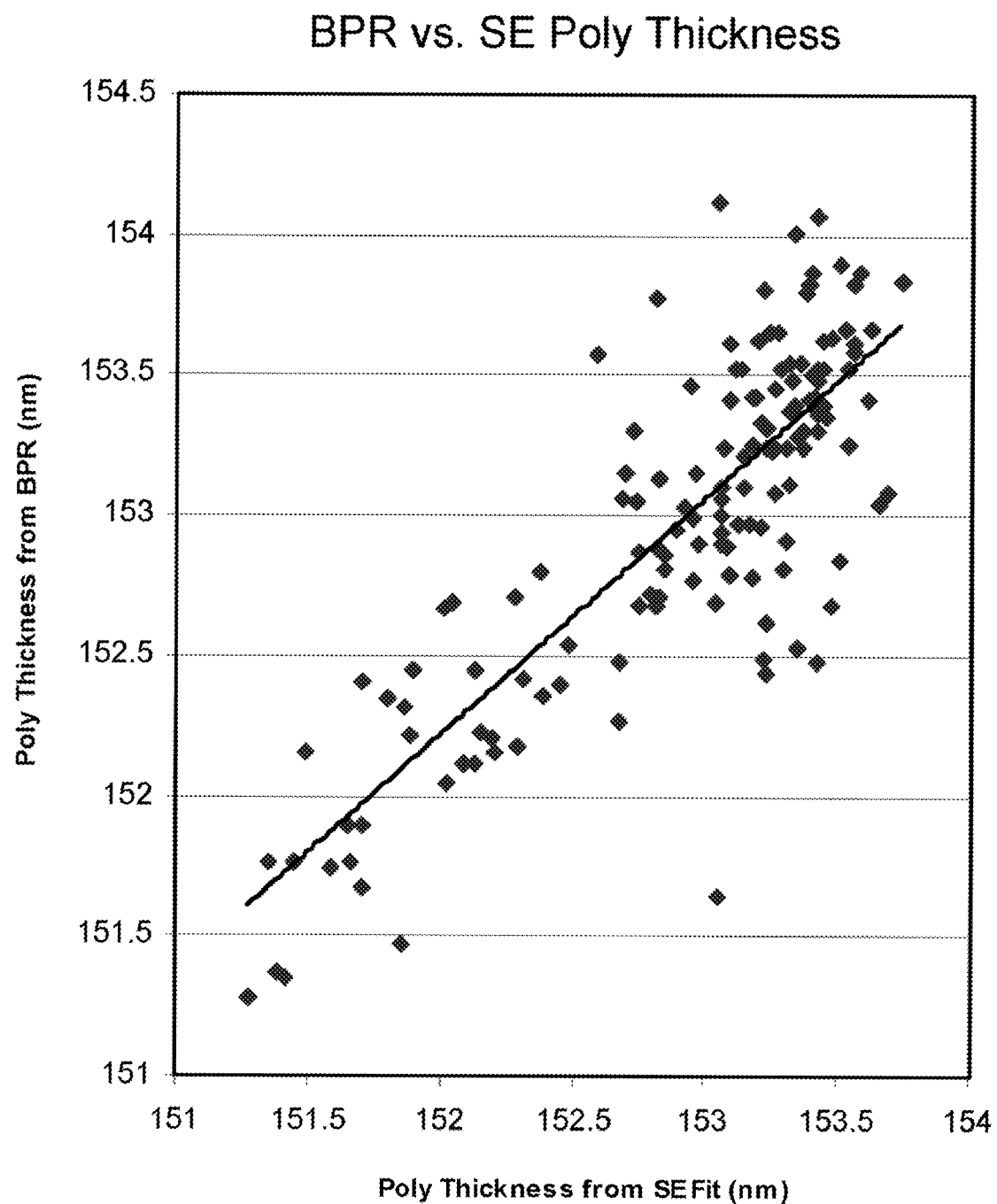
FIG. 10 is a scatter plot showing the correlation between BPR and SE poly thickness measurements.
Figure 11:
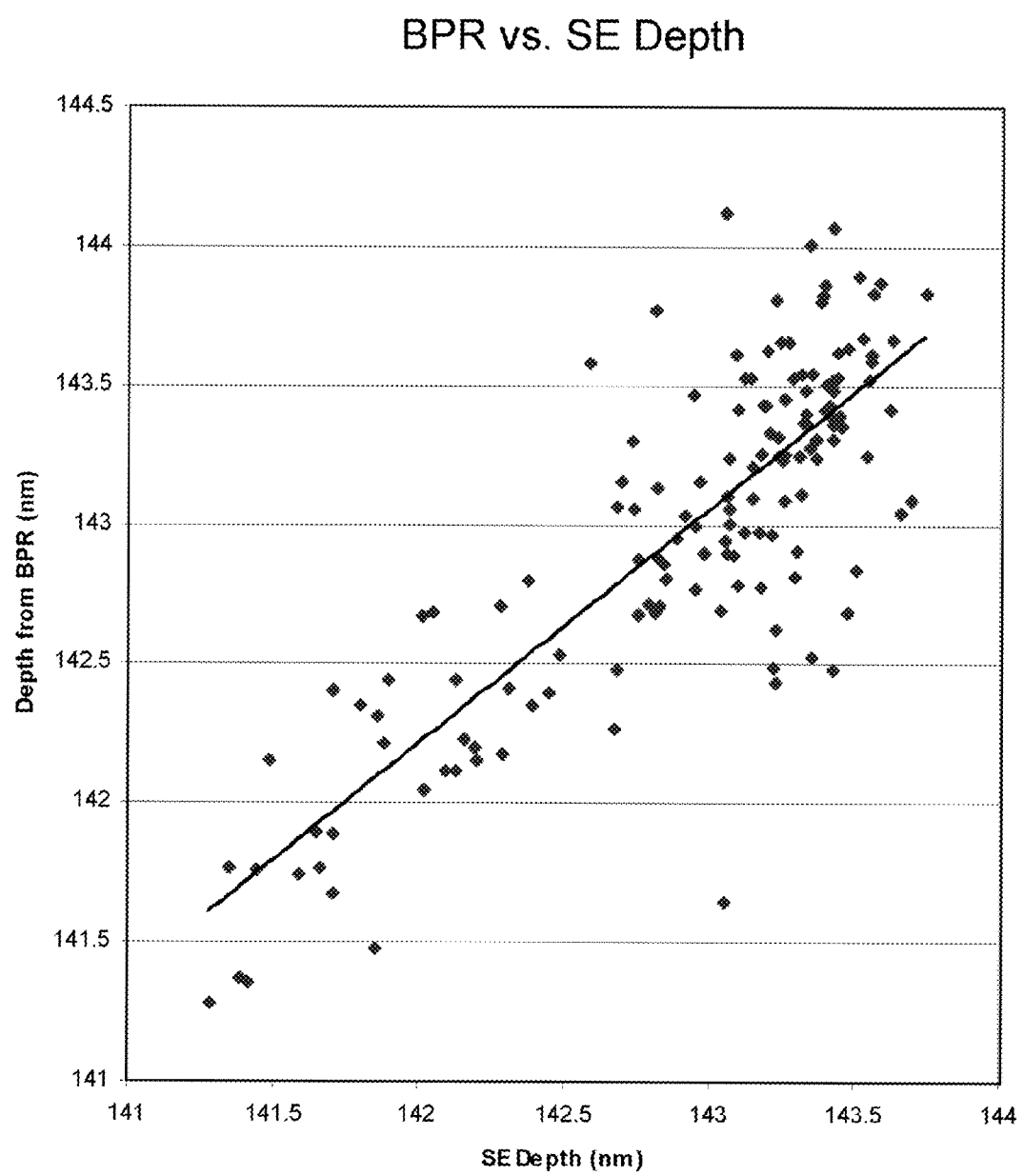
FIG. 11 is a scatter plot showing the correlation between BPR and SE recess depth measurements.
Figure 12:
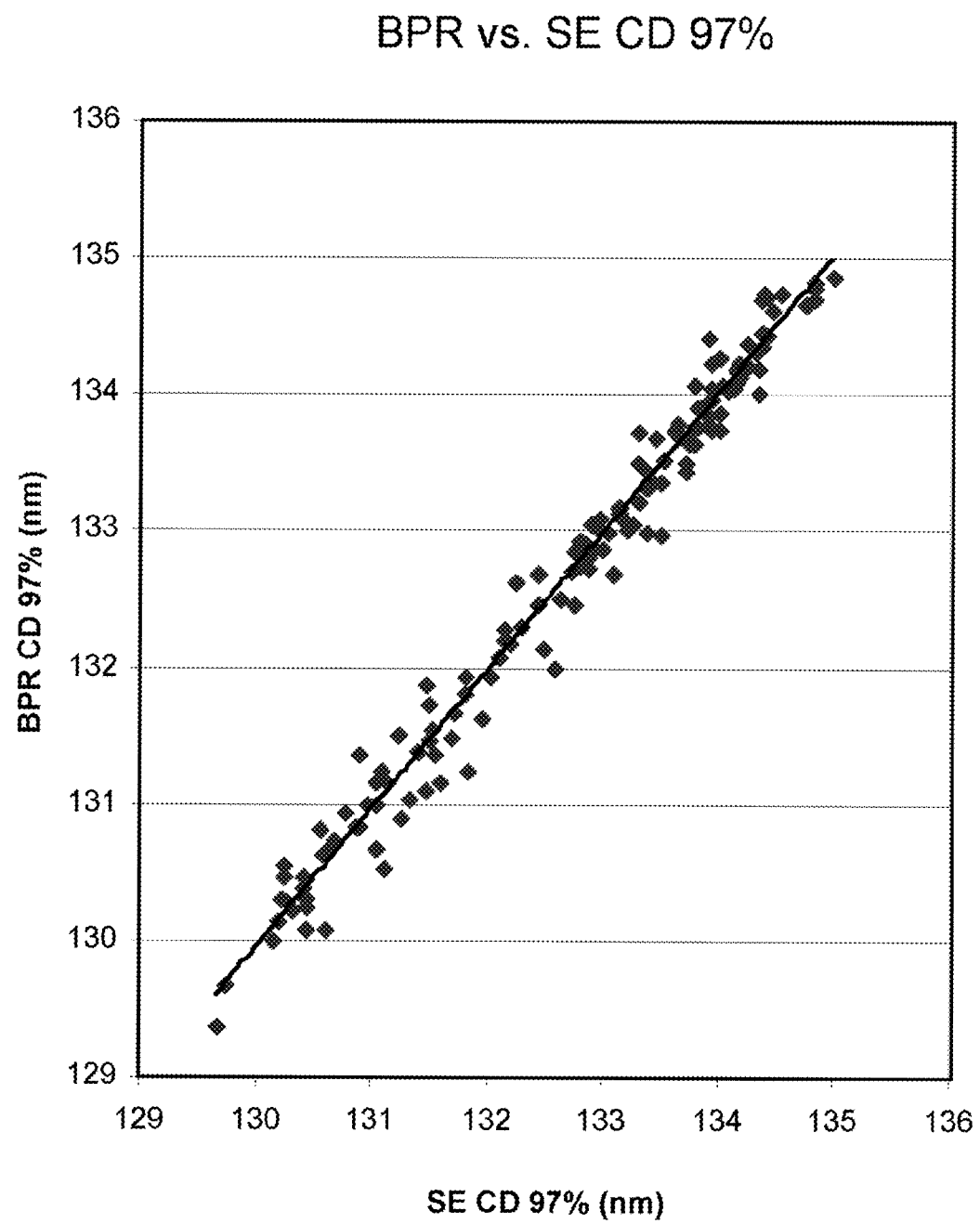
FIG. 12 is a scatter plot showing the correlation between BPR and SE CD width measurements.

Turning first to FIG. 10, the data points were taken from the leftover (75%) of the measurement data after the neural network had been trained. Thus, a BPR measurement (which is a spatially averaged measurement) is run through the neural network to determine poly thickness. This neural network computed result is compared to the actual modeled results computed from the more robust SE (spectroscopic ellipsometer) measurements taken in the same region. It can be seen that the results are fairly consistent over a range of thicknesses. FIGS. 11 and 12 are similar plots for different sample parameters, specifically, recess depth and CD width.

Figures 14A, 14B:
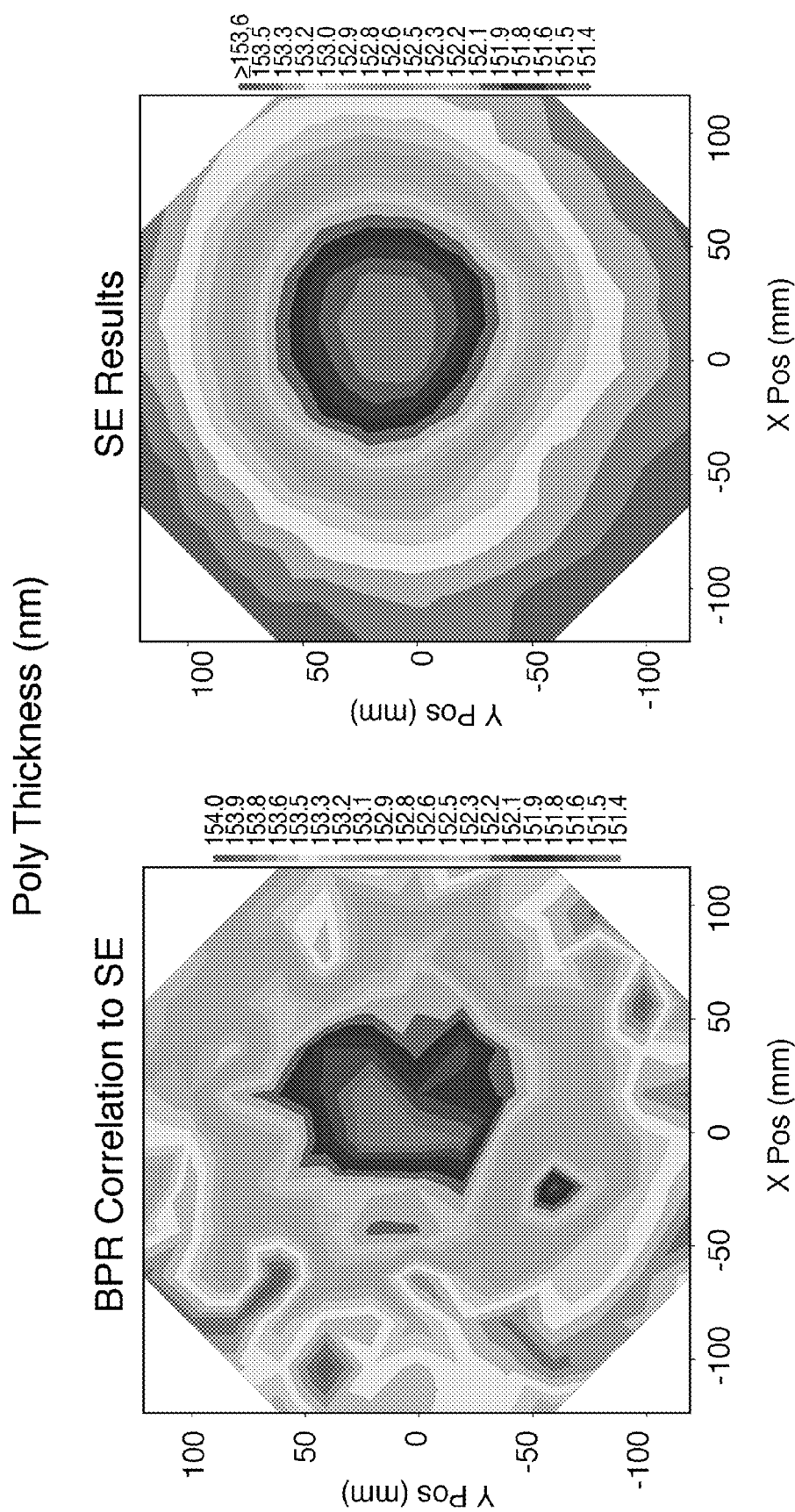
FIGS. 14a and 14b are wafer maps comparing BPR and SE measurements of poly thickness.

FIGS. 13 and 14 are full wafer plots. FIG. 13a shows the recess depth based on the BPR measurements as correlated to the SE measurements. FIG. 13b shows recess depth calculated directly from the SE measurements. The side by side similarity demonstrates the good results with the neural network approach. FIGS. 14a and 14b are similar but relate to poly thickness.

Figure 15:
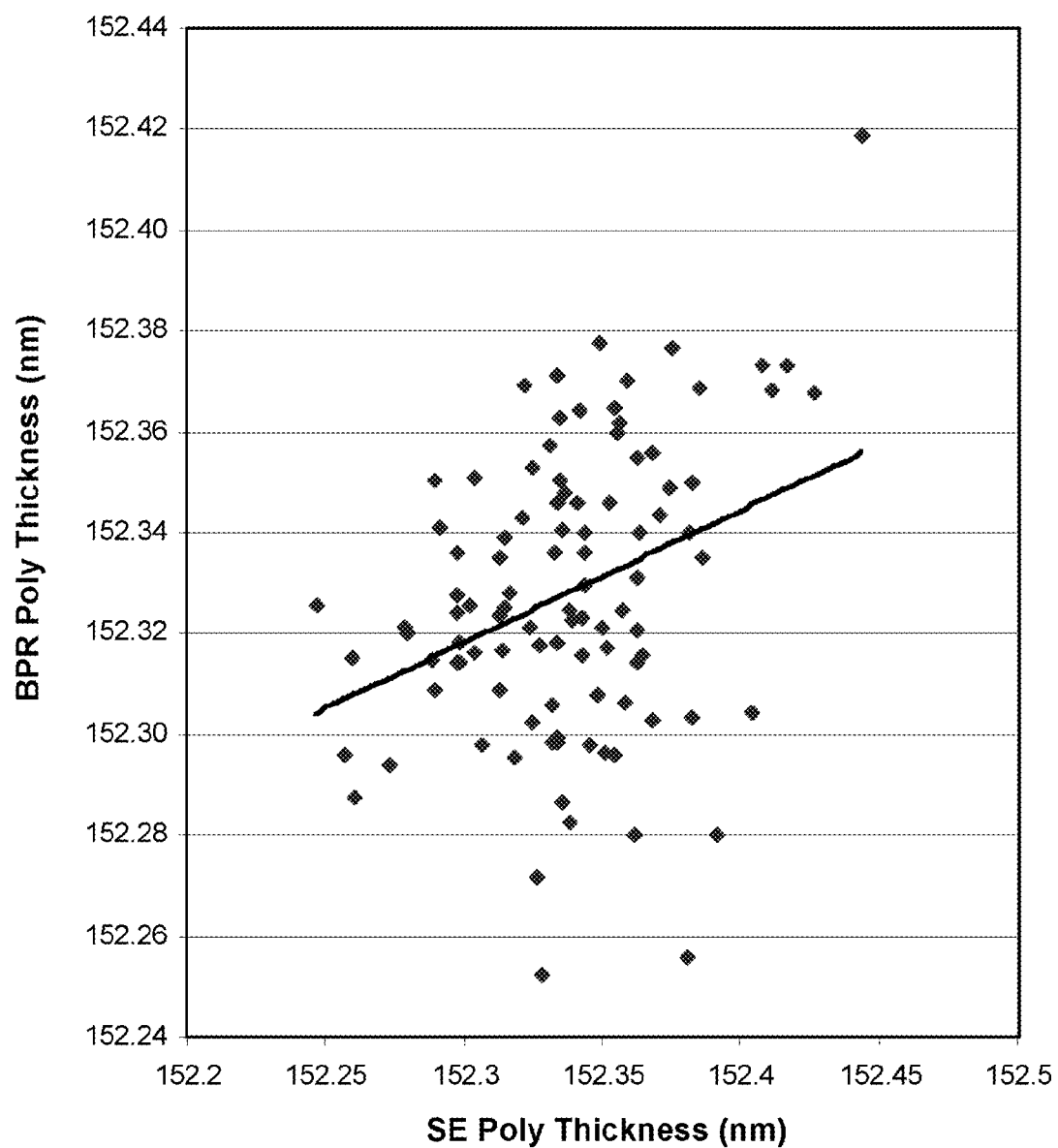
FIG. 15 is a scatter plot showing the correlation between BPR and SE poly thickness measurements obtained within a cell area.
Figure 16:
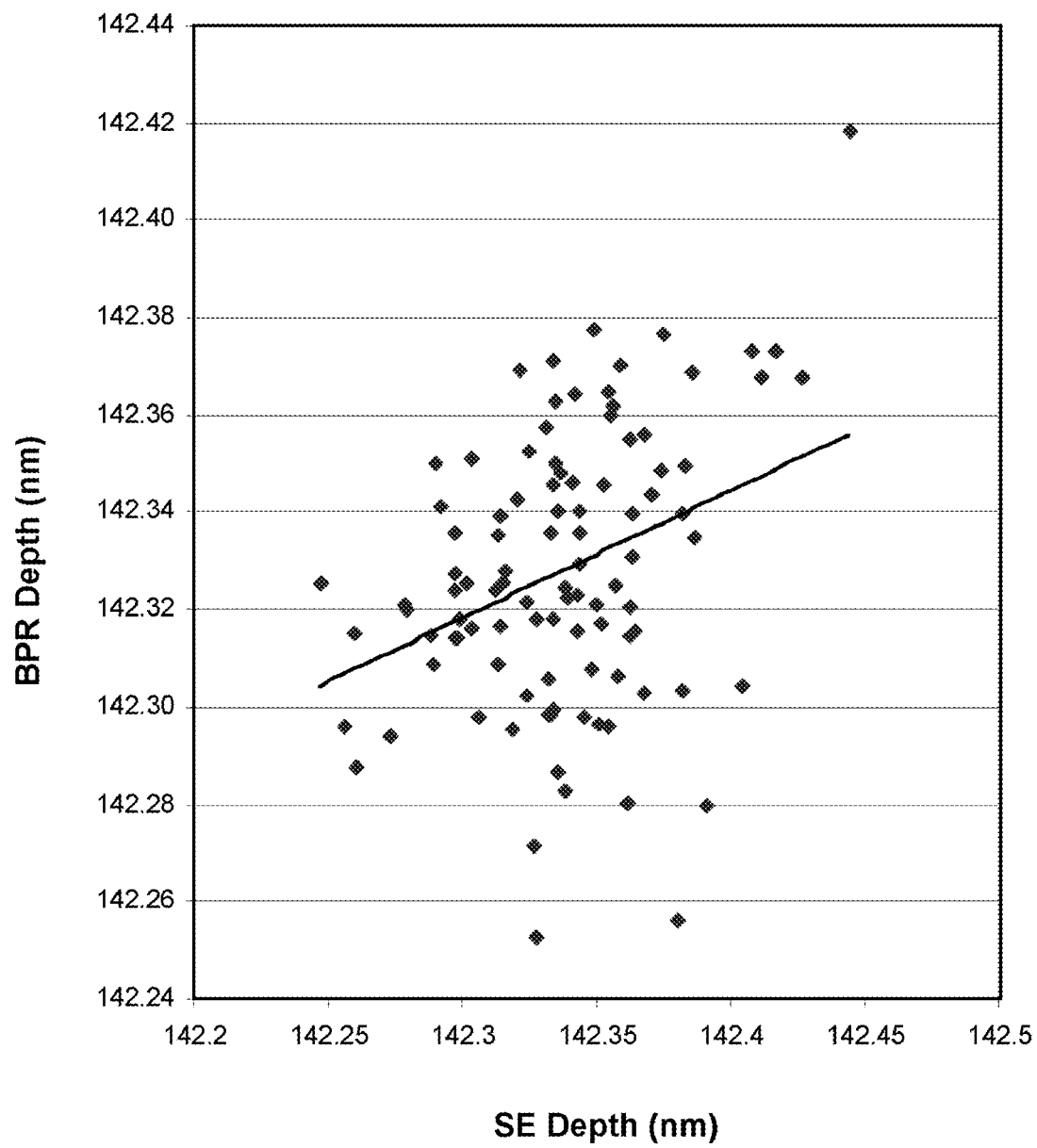
FIG. 16 is a scatter plot showing the correlation between BPR and SE CD recess depth obtained within a cell area.
Figure 17:
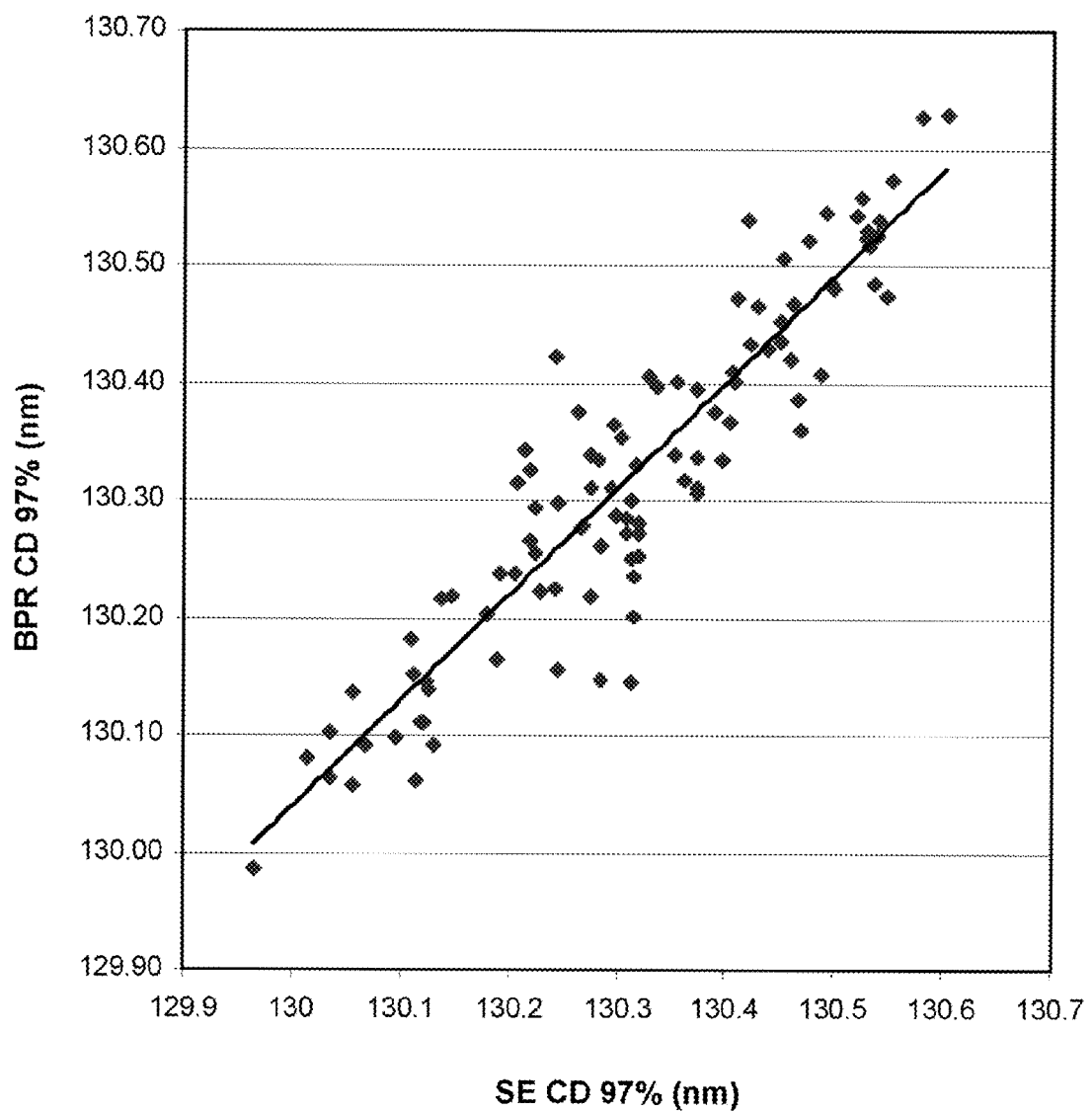
FIG. 17 is a scatter plot showing the correlation between BPR and SE CD width measurements obtained within a cell area.
Figures 18A, 18B:
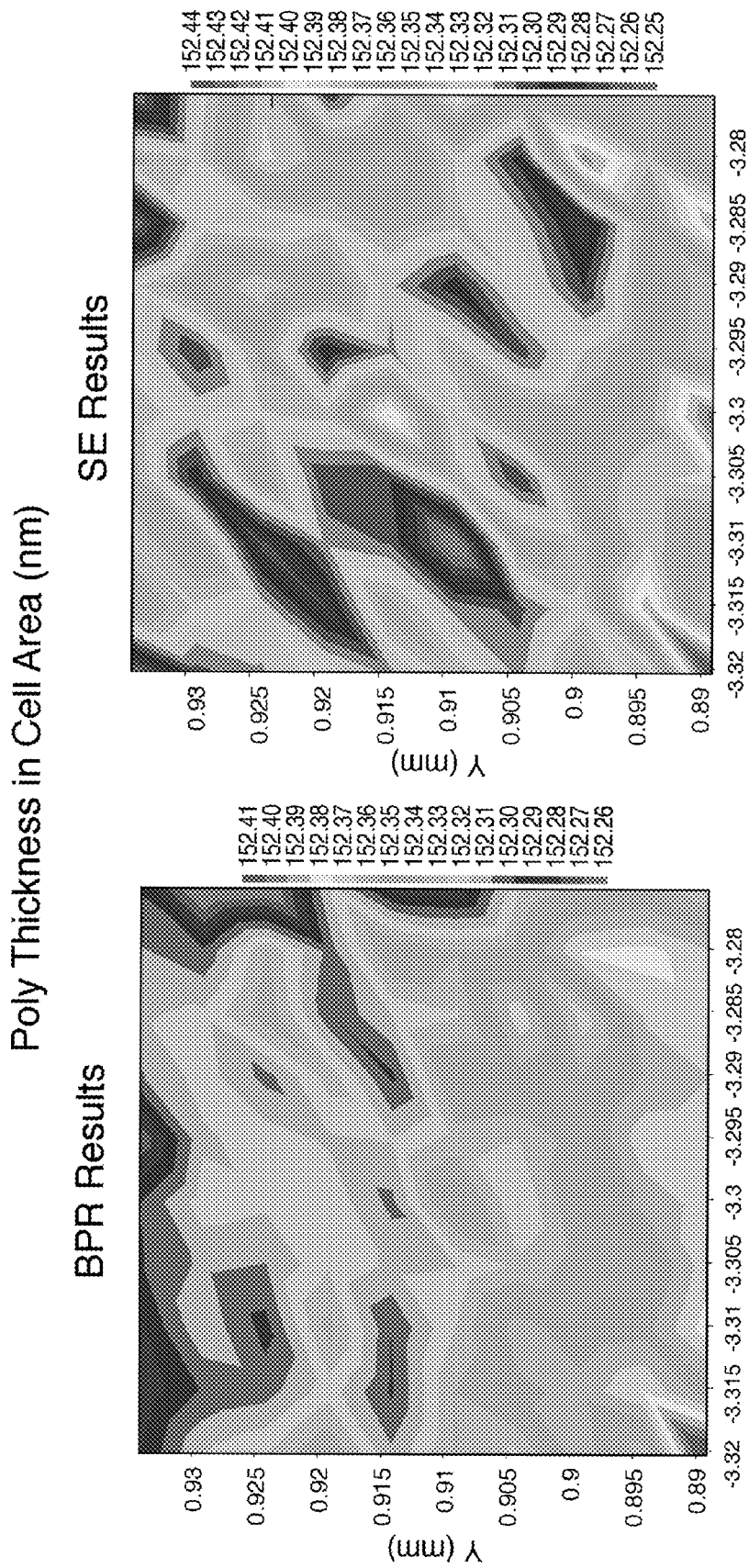
FIGS. 18a and 18b are wafer maps comparing BPR and SE measurements of poly thickness obtained within a cell area.
Figure 19B:
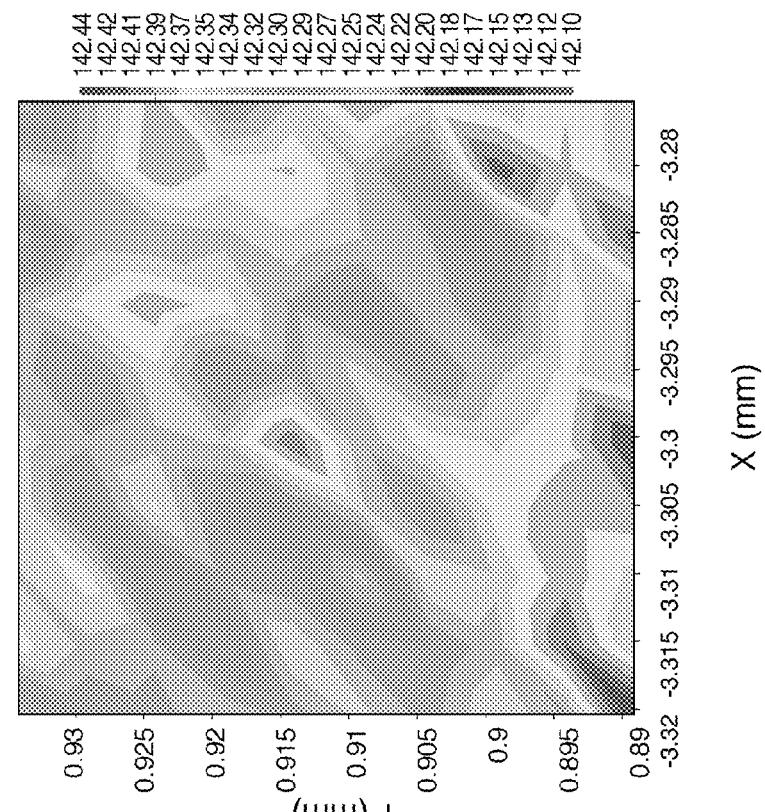
FIGS. 19a and 19b are wafer maps comparing BPR and SE measurements of cell depth obtained within a cell area.
Figure 19A:
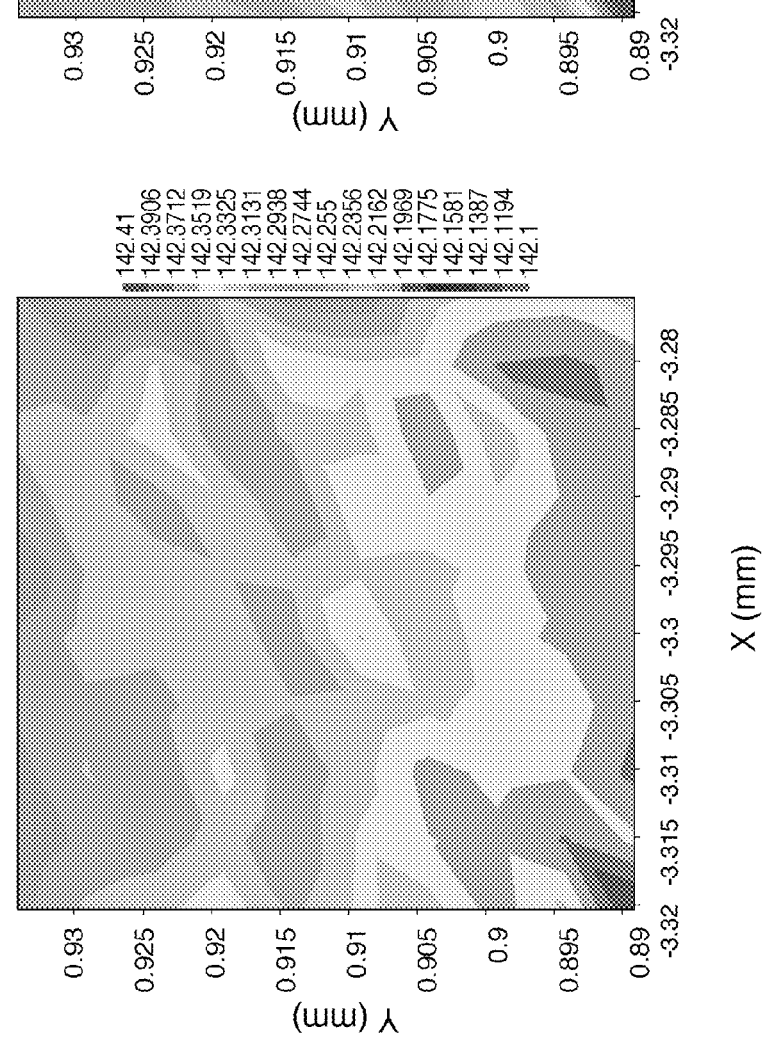

FIGS. 15 to 17 are similar to FIGS. 10 to 12 with the difference being that the measurements were taken within a memory cell area rather than across the entire wafer. FIGS. 18 to 20 are like FIGS. 13 and 14 except that the measurements were taken within a memory cell area.

In initial experiments, a neural network was tested using publicly available neural network software. In a first experiment, we used the neural network features available in Matlab. More recently, we have implemented the approach with Fast Artificial Neural Network Library (FANN). Fast Artificial Neural Network Library is a free, open source neural network library, which implements multilayer artificial neural networks in C with support for both fully connected and sparsely connected networks. This software can be accessed at http://leenissen.dk/fann.

While the subject invention has been described with reference to some preferred embodiments, various changes and modifications could be made therein, by one skilled in the art, without varying from the scope and spirit of the subject invention as defined by the appended claims

We claim:

1. An apparatus for evaluating the characteristics of physical structures within a die on a semiconductor product wafer comprising:
   a laser generating a probe beam of radiation;
   optics for focusing the probe beam to a spot within the die;
   a detector for monitoring the probe beam after reflection from within the die and generating output signals in response thereto; and
   a processor for analyzing the output signals to evaluate the characteristics of physical structures within the die, with the analysis including a comparison to calibration information, said calibration information being derived by measuring a calibration sample using both a laser metrology technology and a spectroscopic metrology technology.

2. An apparatus as recited in claim 1 wherein the optics focuses the probe beam to spot having a diameter on the order of one micron in diameter.

3. An apparatus as recited in claim 1 wherein the spectroscopic metrology technology includes a broad band radiation beam which is focused onto the sample to a spot size larger than the spot size of the laser probe beam.

4. An apparatus as recited in claim 3 wherein the calibration information is generated with a model based analysis that correlates the results between the laser metrology technology and the spectroscopic metrology technology.

5. An apparatus as recited in claim 4 wherein the laser metrology technology includes a calibration laser beam and during the generation of the calibration information, the calibration laser beam is scanned over the region measured by the broad band radiation beam.

6. An apparatus as recited in claim 1 wherein the detector is configured to generate an output corresponding to multiple angles of incidence.

7. An apparatus as recited in claim 6 wherein the detector is in the form of a two dimensional array of detector elements.

8. An apparatus as recited in claim 1 wherein the probe beam is directed to multiple locations in order to determine the uniformity of the physical structures within the die.

9. An apparatus as recited in claim 1 wherein the processor determines at least one parameter associated with the physical structure within the eye, said parameter being selected from the group consisting of line spacing, line depth and sidewall shape.

10. An apparatus for evaluating the characteristics of physical structures within a die on a semiconductor product wafer comprising:
    a laser generating a probe beam of radiation;
    optics for focusing the probe beam to a spot within the die;
    a detector for monitoring the probe beam after reflection from within the die and generating output signals in response thereto; and
    a processor for analyzing the output signals to evaluate the characteristics of physical structures within the die, with the analysis including a comparison to calibration information, said calibration information being derived by measuring a calibration sample using both a laser metrology technology and a spectroscopic metrology technology wherein the spectroscopic metrology technology includes a broad band radiation beam which is focused onto the sample to a spot size larger than the spot size of the laser probe beam and wherein the calibration information is generated with a model based analysis that correlates the results between the laser metrology technology and the spectroscopic metrology technology.

11. An apparatus as recited in claim 10 wherein the optics focuses the probe beam to spot having a diameter on the order of one micron in diameter.

12. An apparatus as recited in claim 10 wherein the laser metrology technology includes a calibration laser beam and during the generation of the calibration information, the calibration laser beam is scanned over the region measured by the broad band radiation beam.

13. An apparatus as recited in claim 10 wherein the detector is configured to generate an output corresponding to multiple angles of incidence.

14. An apparatus as recited in claim 13 wherein the detector is in the form of a two dimensional array of detector elements.

15. An apparatus as recited in claim 10 wherein the probe beam is directed to multiple locations in order to determine the uniformity of the physical structures within the die.

16. An apparatus as recited in claim 10 wherein the processor determines at least one parameter associated with the physical structure within the die, said parameter being selected from the group consisting of line spacing, line depth and sidewall shape.

* * * * *